United States Patent
Imade et al.

(10) Patent No.: US 7,995,167 B2
(45) Date of Patent: Aug. 9, 2011

(54) LIQUID CRYSTAL DISPLAY DEVICE AND METHOD FOR MANUFACTURING LIQUID CRYSTAL DISPLAY DEVICE

(75) Inventors: Mitsunori Imade, Osaka (JP); Hajime Imai, Osaka (JP); Hideki Kitagawa, Osaka (JP); Tetsuo Kikuchi, Osaka (JP); Yoshihito Hara, Osaka (JP); Junya Shimada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 278 days.

(21) Appl. No.: 12/446,099

(22) PCT Filed: Oct. 16, 2007

(86) PCT No.: PCT/JP2007/070160
§ 371 (c)(1),
(2), (4) Date: Apr. 17, 2009

(87) PCT Pub. No.: WO2008/047788
PCT Pub. Date: Apr. 24, 2008

(65) Prior Publication Data
US 2010/0321618 A1    Dec. 23, 2010

(30) Foreign Application Priority Data
Oct. 18, 2006  (JP) .................... 2006-284207

(51) Int. Cl.
*G02F 1/1335* (2006.01)
(52) U.S. Cl. .......................................... 349/113
(58) Field of Classification Search ............ 349/113
See application file for complete search history.

(56) References Cited

U.S. PATENT DOCUMENTS

| 4,345,249 A | 8/1982 | Togashi |
| 4,889,412 A | 12/1989 | Clerc et al. |
| 5,508,834 A | 4/1996 | Yamada et al. |

(Continued)

FOREIGN PATENT DOCUMENTS

CN    1544985 A    11/2004

(Continued)

OTHER PUBLICATIONS

International Search Report for PCT/JP2007/070160, mailed Nov. 27, 2007.

(Continued)

*Primary Examiner* — Sung H Pak
(74) *Attorney, Agent, or Firm* — Nixon & Vanderhye, P.C.

(57) ABSTRACT

A transflective-type and a reflection-type liquid crystal display device having a high reflection efficiency and a high image quality are provided. A liquid crystal display device of the present invention is a liquid crystal display device including a reflection region, wherein the reflection region includes an insulating layer, a semiconductor layer and a reflective layer formed on a metal layer having a plurality of recesses therein; a plurality of protrusions of the metal layer, each having a bottom surface, an upper surface and a slope, are formed between the plurality of recesses of the metal layer; and a width a of a bottom surface of at least one of the plurality of protrusions in the metal layer satisfies $a \leq 2(x+y)/\tan\theta$, where a denotes the width of the bottom surface of each of the plurality of protrusions, x a thickness between the bottom surface and the upper surface, $\theta$ a tilt angle of the slope with respect to the bottom surface, and y a total thickness of the insulating layer, the semiconductor layer and the reflective layer.

24 Claims, 10 Drawing Sheets

U.S. PATENT DOCUMENTS

| | | |
|---|---|---|
| 5,666,179 A | 9/1997 | Koma |
| 5,811,835 A | 9/1998 | Seiki et al. |
| 6,031,591 A | 2/2000 | Hamanaka |
| 6,069,740 A | 5/2000 | Hamanaka |
| 6,129,439 A | 10/2000 | Hou et al. |
| 6,195,140 B1 | 2/2001 | Kubo et al. |
| 6,208,395 B1 | 3/2001 | Kanoh et al. |
| 6,287,899 B1 | 9/2001 | Park et al. |
| 6,340,998 B1 | 1/2002 | Kim et al. |
| 6,384,889 B1 | 5/2002 | Miyachi et al. |
| 6,661,488 B1 | 12/2003 | Takeda et al. |
| 6,710,825 B2 | 3/2004 | Kubo et al. |
| 6,717,642 B2 | 4/2004 | Sasaki et al. |
| 6,771,346 B2 | 8/2004 | Sugimoto et al. |
| 6,784,961 B2 | 8/2004 | Suzuki et al. |
| 6,788,375 B2 | 9/2004 | Ogishima et al. |
| 6,829,026 B2 | 12/2004 | Sasaki et al. |
| 6,839,107 B2 | 1/2005 | Kobashi |
| 6,839,108 B1 | 1/2005 | Hirakata et al. |
| 6,862,062 B2 | 3/2005 | Kubo et al. |
| 6,894,840 B2 | 5/2005 | Yamanaka et al. |
| 6,924,876 B2 | 8/2005 | Kubo et al. |
| 6,950,160 B2 | 9/2005 | Kubo et al. |
| 6,965,422 B2 | 11/2005 | Kubo et al. |
| 6,989,874 B2 | 1/2006 | Chae |
| 6,995,826 B2 | 2/2006 | Kubo et al. |
| 7,084,943 B2 | 8/2006 | Kubo et al. |
| 7,139,055 B2 | 11/2006 | Ogishima et al. |
| 7,145,624 B2 | 12/2006 | Kubo et al. |
| 7,202,923 B2 | 4/2007 | Yamabuchi et al. |
| 7,215,395 B2 | 5/2007 | Kubo et al. |
| 7,230,664 B2 | 6/2007 | Kubo et al. |
| 7,292,300 B2 | 11/2007 | Kubo et al. |
| 7,375,781 B2 | 5/2008 | Kubo |
| 7,379,137 B2 | 5/2008 | Kubo |
| 2001/0033353 A1 | 10/2001 | Shimoshikiryo |
| 2002/0022364 A1 | 2/2002 | Hatta et al. |
| 2002/0036740 A1 | 3/2002 | Kubo et al. |
| 2002/0054269 A1 | 5/2002 | Maeda et al. |
| 2002/0075436 A1 | 6/2002 | Kubo et al. |
| 2002/0080320 A1 | 6/2002 | Suzuki et al. |
| 2002/0191128 A1 | 12/2002 | Okumura et al. |
| 2003/0089949 A1 | 5/2003 | Lin et al. |
| 2003/0112213 A1 | 6/2003 | Noguchi et al. |
| 2003/0186478 A1 | 10/2003 | Morita et al. |
| 2003/0227429 A1 | 12/2003 | Shimoshikiryo |
| 2003/0231267 A1 | 12/2003 | Murai et al. |
| 2004/0027702 A1 | 2/2004 | Matsushita et al. |
| 2004/0070714 A1 | 4/2004 | Ishii et al. |
| 2004/0135949 A1 | 7/2004 | Maeda |
| 2005/0041186 A1 | 2/2005 | Shimoshikiryo |
| 2005/0056127 A1 | 3/2005 | Yamabuchi et al. |
| 2005/0122452 A1 | 6/2005 | Yoshida et al. |
| 2005/0140876 A1 | 6/2005 | Kubo |
| 2005/0168674 A1 | 8/2005 | Kubo |
| 2005/0190322 A1 | 9/2005 | Okabe et al. |
| 2005/0205870 A1 | 9/2005 | Yamazaki |
| 2005/0237463 A1 | 10/2005 | Kubo |
| 2005/0270447 A1 | 12/2005 | Tasaka et al. |
| 2006/0055852 A1 | 3/2006 | Yoshida et al. |
| 2006/0119776 A1 | 6/2006 | Kubo et al. |
| 2006/0158574 A1 | 7/2006 | Kubo et al. |
| 2006/0278874 A1 | 12/2006 | Kubo et al. |
| 2006/0291065 A1 | 12/2006 | Hasei et al. |
| 2007/0019132 A1 | 1/2007 | Kim et al. |
| 2007/0097293 A1 | 5/2007 | Nakanishi et al. |
| 2007/0139594 A1 | 6/2007 | Kubo et al. |
| 2007/0199504 A1 | 8/2007 | Nakamura et al. |
| 2007/0216827 A1 | 9/2007 | Okada et al. |
| 2008/0266499 A1 | 10/2008 | Kubo |
| 2009/0284683 A1 | 11/2009 | Usukura et al. |
| 2010/0007815 A1 | 1/2010 | Kosegawa et al. |
| 2010/0014031 A1 | 1/2010 | Kikuchi et al. |
| 2010/0020263 A1 | 1/2010 | Murao et al. |
| 2010/0039583 A1 | 2/2010 | Usukura |
| 2010/0045885 A1 | 2/2010 | Imai et al. |
| 2010/0045917 A1 | 2/2010 | Imai et al. |
| 2010/0053517 A1 | 3/2010 | Imai et al. |
| 2010/0060813 A1 | 3/2010 | Kawashima et al. |
| 2010/0110352 A1 | 5/2010 | Saitoh et al. |
| 2010/0118227 A1 | 5/2010 | Shibata et al. |
| 2010/0118238 A1 | 5/2010 | Shimada et al. |
| 2010/0157213 A1 | 6/2010 | Kubo |
| 2010/0182527 A1* | 7/2010 | Kikuchi et al. ............... 349/46 |
| 2010/0315578 A1* | 12/2010 | Hara et al. .................. 349/113 |

FOREIGN PATENT DOCUMENTS

| | | |
|---|---|---|
| EP | 0 645 661 A1 | 3/1995 |
| EP | 1 701 202 A1 | 9/2006 |
| JP | 63-21907 B2 | 5/1988 |
| JP | 63-296004 | 12/1988 |
| JP | 02-149802 | 6/1990 |
| JP | 4-372934 | 12/1992 |
| JP | 05-188364 | 7/1993 |
| JP | 5-333328 | 12/1993 |
| JP | 06-034966 | 2/1994 |
| JP | 6-331831 | 12/1994 |
| JP | 07-027913 | 1/1995 |
| JP | 08-148254 | 6/1996 |
| JP | 8-190089 | 7/1996 |
| JP | 9-54318 A | 2/1997 |
| JP | 10-325953 | 12/1998 |
| JP | 11-095197 | 4/1999 |
| JP | 11-109390 | 4/1999 |
| JP | 11-237625 A | 8/1999 |
| JP | 11-242225 A | 9/1999 |
| JP | 11-295697 | 10/1999 |
| JP | 11-337961 | 12/1999 |
| JP | 2000-010124 | 1/2000 |
| JP | 2000-249807 | 9/2000 |
| JP | 2000-329906 | 11/2000 |
| JP | 2001-021862 A | 1/2001 |
| JP | 2001-201619 | 7/2001 |
| JP | 2001-337323 | 12/2001 |
| JP | 2002-236283 | 8/2002 |
| JP | 2003-035824 | 2/2003 |
| JP | 2003-43525 A | 2/2003 |
| JP | 2003-270636 | 9/2003 |
| JP | 2003-280548 | 10/2003 |
| JP | 2003-297850 A | 10/2003 |
| JP | 2003-315803 | 11/2003 |
| JP | 2003-337207 | 11/2003 |
| JP | 2004-258366 | 9/2004 |
| JP | 2004-264653 | 9/2004 |
| JP | 2004-325503 | 11/2004 |
| JP | 2005-128082 | 5/2005 |
| JP | 2005-157105 A | 6/2005 |
| JP | 2005-195733 | 7/2005 |
| JP | 2005-208553 | 8/2005 |
| JP | 2005-221639 | 8/2005 |
| JP | 2005-266370 | 9/2005 |
| JP | 2005-313638 | 11/2005 |
| JP | 2006-091229 | 4/2006 |
| JP | 2006-098525 A | 4/2006 |
| JP | 2006-184673 | 7/2006 |
| JP | 2006-220711 | 8/2006 |
| JP | 2006-220922 | 8/2006 |
| JP | 2006-293410 | 10/2006 |
| JP | 2007-101843 | 4/2007 |
| JP | 2007-133037 | 5/2007 |
| JP | 2007-329099 | 12/2007 |
| JP | 2008-242307 A | 10/2008 |
| KR | 2003-058012 A | 7/2003 |
| KR | 2003-058140 A | 7/2003 |

OTHER PUBLICATIONS

U.S. Appl. No. 12/299,138, Imai et al., filed Oct. 31, 2008.
U.S. Appl. No. 12/299,154, Kikuchi et al., filed Oct. 31, 2008.
U.S. Appl. No. 12/306,959, Nara, filed Dec. 30, 2008.
U.S. Appl. No. 12/446,071, filed Apr. 17, 2009, entitled "Liquid Crystal Display and Method of Manufacturing Liquid Crystal Display".
U.S. Appl. No. 12/666,461, filed Dec. 23, 2009, entitled "Liquid Crystal Display Device and Method of Manufacturing Liquid Crystal Display Device".

U.S. Appl. No. 12/664,983, filed Dec. 16, 2009, entitled "Liquid Crystal Display Device".
International Search Report for PCT/JP2006/315142 mailed Aug. 22, 2006.
English translation of the International Preliminary Report on Patentability mailed Feb. 14, 2008 in corresponding PCT Application No. PCT/JP2006/315142.
KR Notice of Reasons for Rejection and English translation thereof mailed Apr. 25, 2006 in corresponding Korean application No. 10-2004-0110955.
Kalantar, "Viewing Angle Control Using Optical Microstructures on Light-Guide Plate for Illumination System of Mobile Transmissive LCD Module", *IDW'02*, pp. 549-552.
Funamoto et al, "Prism-Sheetless High Bright Back0light System for Mobile Phone", *IDW'04*, pp. 687-690.
Suqita et al, "Brightness Enhancement in Transflective LCD by Concentration of Uniaxially Collimated Light with a Micro-Lenticular Lens", , IDW 2007, pp. 1515-1518.

Kubo et al., "Development of High-Performance ASV-LCDs Using Continuous Pinwheel Alignment (CPA) Mode", pp. 1-5, Jun. 7, 2001.
EP Supplementary Search Report mailed Dec. 17, 2009 in EP application 07791179.0.
EP Supplementary Search Report mailed Dec. 29, 2009 in EP application 07806137.1.
English translation of International Preliminary Report on Patentability mailed Apr. 30, 2009 in corresponding PCT Application No. PCT/JP2007/070160.
English translation of International Preliminary Report on Patentability mailed Apr. 30, 2009 in corresponding PCT Application No. PCT/JP2007/067511.
U.S. Office Action mailed Jun. 23, 2010 in corresponding U.S. Appl. No. 11/997,563.

* cited by examiner (a)

(b)

(a)

(b)

(a)

(b)

(c)

(d)

(e)

(a)

(b)

(c)

(d)

(e)

(a)

(b)

(c)

(d)

(e)

(a)

(b)

LIQUID CRYSTAL DISPLAY DEVICE AND METHOD FOR MANUFACTURING LIQUID CRYSTAL DISPLAY DEVICE

This application is the U.S. national phase of International Application No. PCT/JP2007/070160, filed 16 Oct. 2007, which designated the U.S. and claims priority to Japanese Patent Application No. 2006-284207, filed 18 Oct. 2006, the entire contents of each of which are hereby incorporated by reference.

TECHNICAL FIELD

The present invention relates to a reflection-type or transflective-type liquid crystal display device capable performing display by utilizing reflected light.

BACKGROUND ART

Liquid crystal display devices include the transmission-type liquid crystal display device which utilizes backlight from behind the display panel as a light source for displaying, the reflection-type liquid crystal display device which utilizes reflected light of external light, and the transflective-type liquid crystal display device which utilizes both external light and backlight as light sources. The reflection-type liquid crystal display device and the transflective-type liquid crystal display device are characterized in that they have smaller power consumptions than that of the transmission-type liquid crystal display device, and their displayed images are easy to see in a bright place. The transflective-type liquid crystal display device is characterized in that the display is easier to see than that of the reflection-type liquid crystal display device, even in a dark place.

FIG. 13 is a cross-sectional view of an active matrix substrate 100 in a conventional reflection-type liquid crystal display device (e.g., Patent Document 1).

As show in FIG. 13, the active matrix substrate 100 includes an insulative substrate 101, as well as a gate layer 102, a gate insulating layer 104, a semiconductor layer 106, a metal layer 108, and a reflective layer 110, which are stacked on the insulative substrate 101. After being stacked on the insulative substrate 101, the gate layer 102, the gate insulating layer 104, the semiconductor layer 106, and a metal layer 108 are subjected to etching by using one mask, thus being formed so as to have an island-like multilayer structure. Thereafter, the reflective layer 110 is formed on this multilayer structure, whereby a reflection surface 112 having recesses/protrusions is formed. Although not shown, transparent electrodes, a liquid crystal layer, a color filter substrate (CF substrate), and the like are formed above the active matrix substrate 100.

[Patent Document 1] Japanese Laid-Open Patent Publication No. 9-54318

DISCLOSURE OF INVENTION

Problems to be Solved by the Invention

In the aforementioned active matrix substrate 100, portions of the reflective layer 110 are formed so as to reach the insulative substrate 101 in portions where a gate layer 102 and the like are not formed (i.e., portions between the islands, hereinafter referred to as "gap portions") Therefore, in the gap portions, the surface of a reflection surface 112 is recessed in the direction of the insulative substrate 101, thus forming deep dents (or recesses).

In the reflection-type or transflective-type liquid crystal display device, in order to perform bright display by utilizing reflected light, it is necessary to allow incident light entering from various directions to be reflected by the reflection surface more uniformly and efficiently over the entire display surface. For this purpose, it is better if the reflection surface is not completely planar but has moderate recesses/protrusions.

However, since the reflection surface 112 of the aforementioned active matrix substrate 100 has deep dents, light is unlikely to reach the reflection surface located on the bottoms of the dents, and even if at all light reaches there, the reflected light thereof is unlikely to be reflected toward the liquid crystal panel. Therefore, the aforementioned conventional liquid crystal display device has a problem in that the reflected light is not effectively used for displaying. Furthermore, there is also a problem in that, since many portions of the reflection surface 112 have a large angle relative to the display surface of the liquid crystal display device, the reflected light from those portions is not effectively utilized for displaying.

FIG. 14 is a diagram showing a relationship between the tilt of the reflection surface 112 and reflected light. FIG. 14(a) shows a relationship between an incident angle α and an outgoing angle β when light enters a medium b having a refractive index Nb from a medium a having a refractive index Na. In this case, according to Snell's Law, the following relationship holds true.

$$Na \times \sin\alpha = Nb \times \sin\beta$$

FIG. 14(b) is a diagram showing a relationship between incident light and reflected light when incident light perpendicularly entering the display surface of an LCD is reflected from a reflection surface which is tilted by θ with respect to the display surface (or the substrate). As shown in the figure, the incident light perpendicularly entering the display surface is reflected from the reflection surface which is tilted by angle θ with respect to the display surface, and goes out in a direction of an outgoing angle φ.

According to Snell's Law, results of calculating the outgoing angle φ according to Snell Law with respect to each angle θ of the reflection surface are shown in Table 1.

TABLE 1

| θ | φ | 90 − φ |
|---|---|--------|
| 0 | 0 | 90 |
| 2 | 6.006121 | 83.99388 |
| 4 | 12.04967 | 77.95033 |
| 6 | 18.17181 | 71.82819 |
| 8 | 24.42212 | 65.57788 |
| 10 | 30.86588 | 59.13412 |
| 12 | 37.59709 | 52.40291 |
| 14 | 44.76554 | 45.23446 |
| 16 | 52.64382 | 37.35618 |
| 18 | 61.84543 | 28.15457 |
| 20 | 74.61857 | 15.38143 |
| 20.5 | 79.76542 | 10.23458 |
| 20.6 | 81.12757 | 8.872432 |
| 20.7 | 82.73315 | 7.266848 |
| 20.8 | 84.80311 | 5.19888 |
| 20.9 | 88.85036 | 1.149637 |
| 20.905 | 89.79914 | 0.200856 |

The values in this Table are calculated by assuming that air has a refractive index of 1.0 and the glass substrate and the liquid crystal layer have a refractive index of 1.5. As shown in Table 1, when the angle θ of the reflection surface exceeds 20 degrees, the outgoing angle φ becomes very large (i.e., 90-φ becomes very small), so that most of the outgoing light does not reach the user. Therefore, even if recesses/protrusions are provided on the reflection surface of the reflective layer, it is necessary to ensure that the angle θ is 20 degrees or less in greater portions of the reflection surface in order to effectively use the reflected light.

Since the reflection surface 112 of the aforementioned active matrix substrate 100 has many portions in which the angle with respect to the display surface is greater than 20 degrees, reflected light is not very effectively used for displaying. In order to solve this problem, it might be possible to form an insulating layer under the reflective layer 110 so as to cover the metal layer 108, thus smoothing the reflection surface. However, this requires a step of forming an insulating layer, a step of forming contact holes for connecting the reflective layer 110 to the drains of TFTs in the insulating layer are needed, etc., thus resulting in a problem of an increase in the material and the number of steps.

Moreover, in the conventional active matrix substrate 100, if the width of the island-like multilayer structure is relatively large, there is formed a flat reflective layer 110 without recesses/protrusions on the multilayer structure, thereby lowering the efficiency in utilizing the reflected light.

The present invention has been made in view of the above problems, and an objective thereof is to provide a reflection-type liquid crystal display device and a transflective-type liquid crystal display device having a high image quality and including a reflection region having a high reflectivity.

Means for Solving the Problems

A liquid crystal display device of the present invention is a liquid crystal display device comprising a reflection region for reflecting incident light toward a display surface, wherein the reflection region includes a metal layer, an insulating layer formed on the metal layer, a semiconductor layer formed on the insulating layer, and a reflective layer formed on the semiconductor layer; a plurality of recesses are formed in the metal layer; recesses/protrusions, reflecting a shape of the metal layer, are formed in the reflective layer in the reflection region; a plurality of protrusions of the metal layer, each having a bottom surface, an upper surface and a slope, are formed between the plurality of recesses of the metal layer; and a width a of the bottom surface of at least one of the plurality of protrusions in the metal layer satisfies $$a \leq 2(x+y)/\tan\theta$$

where a denotes a width of the bottom surface of each of the plurality of protrusions, x a thickness between the bottom surface and the upper surface, θ a tilt angle of the slope with respect to the bottom surface, and y a total thickness of the insulating layer, the semiconductor layer and the reflective layer.

In one embodiment, the width of the bottom surface of at least one of the plurality of protrusions in the metal layer is 15.88 μm or less. In one embodiment, the width of the bottom surface of at least one of the plurality protrusions in the metal layer is 1.00 μm or more. In one embodiment, the tilt angle of the slope of the plurality of protrusions with respect to the bottom surface is 10° or more and less than 90°.

In one embodiment, a plurality of protruding portions of the metal layer including a stepped slope are formed between the plurality of recesses of the metal layer, wherein the stepped slope includes an upper slope, a flat portion and a lower slope, the upper surface of the protrusion is the upper surface of the protruding portion, the slope of the protrusion is the upper slope of the stepped slope, and the bottom surface of the protrusion is formed generally on the same plane as the flat portion of the stepped slope.

In one embodiment, the lower slope of the stepped slope of the metal layer further includes a stepped slope. In one embodiment, a step reflecting the stepped slope of the metal layer is formed on a surface of the reflective layer. In one embodiment, a first recess and a second recess located inside the first recess are formed on a surface of the reflective layer. In one embodiment, the width of the bottom surface of at least one of the plurality of protrusions in the metal layer is 14.75 μm or less.

In one embodiment, a tilt angle of the slope of the plurality of protrusions with respect to the bottom surface is 10° or more and 20° or less, and the width of the bottom surface of at least one of the plurality of protrusions is 2.75 μm or more and 15.88 μm or less. In one embodiment, the metal layer serves as one of a pair of electrodes forming a storage capacitor of the liquid crystal display device.

A method for manufacturing a liquid crystal display device of the present invention is a method for manufacturing a liquid crystal display device having a reflection region for reflecting incident light toward a display surface, comprising: a step of forming a metal film on a substrate; a step of shaping the metal film in the reflection region to form a metal layer having a plurality of recesses; a step of forming an insulating layer on the metal layer; a step of forming a semiconductor layer on the insulating layer; and a step of stacking a metal film on the semiconductor layer to thereby form a reflective layer having recesses/protrusions reflecting a shape of the plurality of recesses of the metal layer, wherein in the step of forming a metal layer, a plurality of protrusions of the metal layer, each having a bottom surface, an upper surface and a slope, are formed between the plurality of recesses; and in the step of forming a metal layer, the metal layer is formed so that a width a of the bottom surface of at least one of the plurality of protrusions satisfies $$a \leq 2(x+y)/\tan\theta$$

where a denotes a width of the bottom surface of each of the plurality of protrusions, x a thickness between the bottom surface and the upper surface, θ a tilt angle of the slope with respect to the bottom surface, and y a total thickness of the insulating layer, the semiconductor layer and the reflective layer.

In one embodiment, the metal layer is formed so that the width of the bottom surface of at least one of the plurality of protrusions is 15.88 μm or less. In one embodiment, the metal layer is formed so that the width of the bottom surface of at least one of the plurality of protrusions is 1.00 μm or more. In one embodiment, the metal layer is formed so that the tilt angle of the slope of the plurality of protrusions with respect to the bottom surface is 10° or more and less than 90°.

In one embodiment, in the step of forming a metal layer, a plurality of protruding portions having a stepped slope and including the plurality of protrusions in upper portions thereof are formed between the plurality of recesses. In one embodiment, in the step of forming a metal layer, a protruding portion having a stepped slope with a plurality of tiers of steps and including the protrusion in an upper portion thereof is formed between the plurality of recesses. In one embodiment, in the step of forming a reflective layer, a step reflecting the stepped slope of the protruding portion of the metal layer is formed on a surface of the reflective layer.

In one embodiment, in the step of forming a reflective layer, a first recess and a second recess located inside the first recess are formed on a surface of the reflective layer. In one embodiment, in the step of forming a metal layer, the metal layer is formed so that a width of the bottom portion of at least one of the plurality of protrusions in the metal layer is 14.75 µm or less.

In one embodiment, in the step of forming a metal layer, the metal layer is formed so that a tilt angle of the slope of the plurality of protrusions with respect to the bottom surface is 10° or more and 20° or less, and the width of the bottom surface of at least one of the plurality of protrusions is 2.75 µm or more and 15.88 µm or less. In one embodiment, the metal layer is formed from the same metal as and concurrently with a gate electrode of a switching element of the liquid crystal display device.

Another liquid crystal display device of the present invention is a liquid crystal display device comprising a reflection region for reflecting incident light toward a display surface, wherein the reflection region includes a metal layer, an insulating layer formed on the metal layer, a reflective layer formed on the insulating layer; a plurality of recesses are formed in the metal layer; recesses/protrusions, reflecting a shape of the metal layer, are formed in the reflective layer in the reflection region; a plurality of protrusions of the metal layer, each having a bottom surface, an upper surface and a slope, are formed between the plurality of recesses of the metal layer; and a width a of the bottom surface of at least one of the plurality of protrusions in the metal layer satisfies $$a \leq 2(x+y)/\tan \theta$$

where a denotes the width of the bottom surface of each of the plurality of protrusions, x a thickness between the bottom surface and the upper surface, θ a tilt angle of the slope with respect to the bottom surface, and y a total thickness of the insulating layer and the reflective layer.

Another method for manufacturing a liquid crystal display device of the present invention is a method for manufacturing a liquid crystal display device having reflection region for reflecting incident light toward a display surface, comprising: a step of forming a metal film on a substrate; a step of shaping the metal film in the reflection region to form a metal layer having a plurality of recesses; a step of forming an insulating layer on the metal layer; a step of stacking a metal film on the insulating layer to thereby form a reflective layer having recesses/protrusions reflecting a shape of the plurality of recesses in the metal layer, wherein in the step of forming a metal layer, a plurality of protrusions of the metal layer, each having a bottom surface, an upper surface and a slope, are formed between the plurality of recesses; and in the step of forming a metal layer, the metal layer is formed so that a width a of the bottom surface of at least one of the plurality of protrusions satisfies $$a \leq 2(x+y)/\tan \theta$$

where a denotes the width of the bottom surface of each of the plurality of protrusions, x a thickness between the bottom surface and the upper surface, θ a tilt angle of the slope with respect to the bottom surface, and y a total thickness of the insulating layer and the reflective layer.

Effects of the Invention

According to the present invention, it is possible to provide a reflection-type liquid crystal display device and a transflective-type liquid crystal display device having a high image quality and including a reflection region having a high reflectivity.

Figure 1:
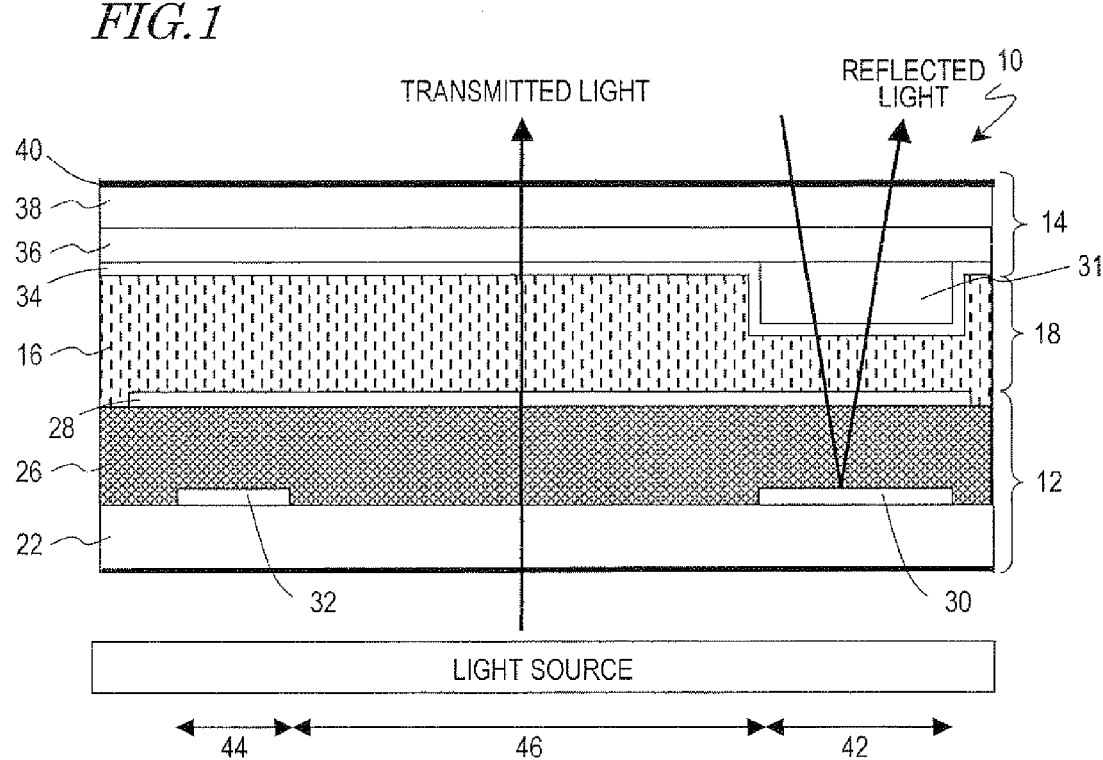
FIG. 1 A diagram schematically showing a cross-sectional shape of the liquid crystal display device according to Embodiment 1 of the present invention.

DESCRIPTION OF THE REFERENCE NUMERALS 10 liquid crystal display device
12 TFT substrate
14 counter substrate
16 liquid crystal
18 liquid crystal layer
22 transparent substrate
26 interlayer insulating layer
28 pixel electrode
30, 30' reflection section
31 layer
32 TFT section
34 counter electrode
36 CF layer
38 transparent substrate
40 display surface
42 reflection region
44 TFT region
46 transmission region
48 recess
50 pixel 52 source line
54 gate line
56, 56' Cs line
57 recess (opening)
58 contact hole
61 gate insulating layer
62 semiconductor layer
63 reflective layer
64 upper three layers
65 surface
66, 66' upper surface
67 slope
68, 68' bottom surface
69 protrusion
69' upper surface
70 lower portion
85 upper slope
86 flat portion
87 lower slope
89 protruding portion
90 slope
91, 92 protrusion

BEST MODE FOR CARRYING OUT THE INVENTION

Embodiment 1

Hereinafter, with reference to the drawing, a first embodiment of the liquid crystal display device according to the present invention will be described.

FIG. 1 schematically shows a cross-sectional structure of a liquid crystal display device 10 of the present embodiment. The liquid crystal display device 10 of the present embodiment is a transflective-type liquid crystal display device by an active matrix method. As shown in FIG. 1, the liquid crystal display device 10 includes a TFT (Thin Film Transistor) substrate 12, a counter substrate 14, and a liquid crystal layer 18 containing liquid crystal 16 which is sealed between the TFT substrate 12 and the counter substrate 14.

The TFT substrate 12 comprises a transparent substrate 22, an interlayer insulating layer 26, and a pixel electrode 28, and includes reflection sections 30 and TFT sections 32. Gate lines (scanning lines), source lines (signal lines), and Cs lines (storage capacitor electrode lines), etc., are formed on the TFT substrate 12, which will be described later.

The counter substrate 14 is a color filter substrate (CF substrate), for example, and includes a counter electrode 34, a color filter layer (CF layer) 36, and a transparent substrate 38. The upper face of the transparent substrate 38 serves as a display surface 40 of the liquid crystal display device. Note that although the TFT substrate 12 and the counter substrate 14 each have an alignment film and a polarizer, they are omitted from the figure.

In the liquid crystal display device 10, a region where a reflection section 30 is formed is referred to as a reflection region 42, whereas a region where a TFT section 32 is formed is referred to as a TFT region 44. In the reflection region 42, light entering from the display surface 40 is reflected by the reflection section 30, and travels through the liquid crystal layer 18 and the counter substrate 14 so as to go out from the display surface 40. The liquid crystal display device 10 further has transmission regions 46 which are formed in regions other than the reflection regions 42 and the TFT regions 44. In the transmission regions 46, light which is emitted from a light source in the display device 10 travels through the TNT substrate 12, the liquid crystal layer 18, and the counter substrate 14 so as to go out from the display surface 40.

Note that, as shown in FIG. 1, a layer 31 which is composed of a transmissive resin or the like is provided at the counter substrate 14 side above each reflection section 30, and the thickness of the liquid crystal layer 18 in the reflection region 42 is a half of the thickness of the liquid crystal layer 18 in the transmission region 46. As a result, the optical path length (the distance over which light travels through the liquid crystal layer 18) in the reflection region 42 and that in the transmission region 46 are equal to each other. Although FIG. 1 illustrates the layer 31 as being formed between the counter electrode 34 and the CF layer 36, the layer 31 may be formed on the face of the counter electrode 34 facing the liquid crystal layer 18.

Figure 2:
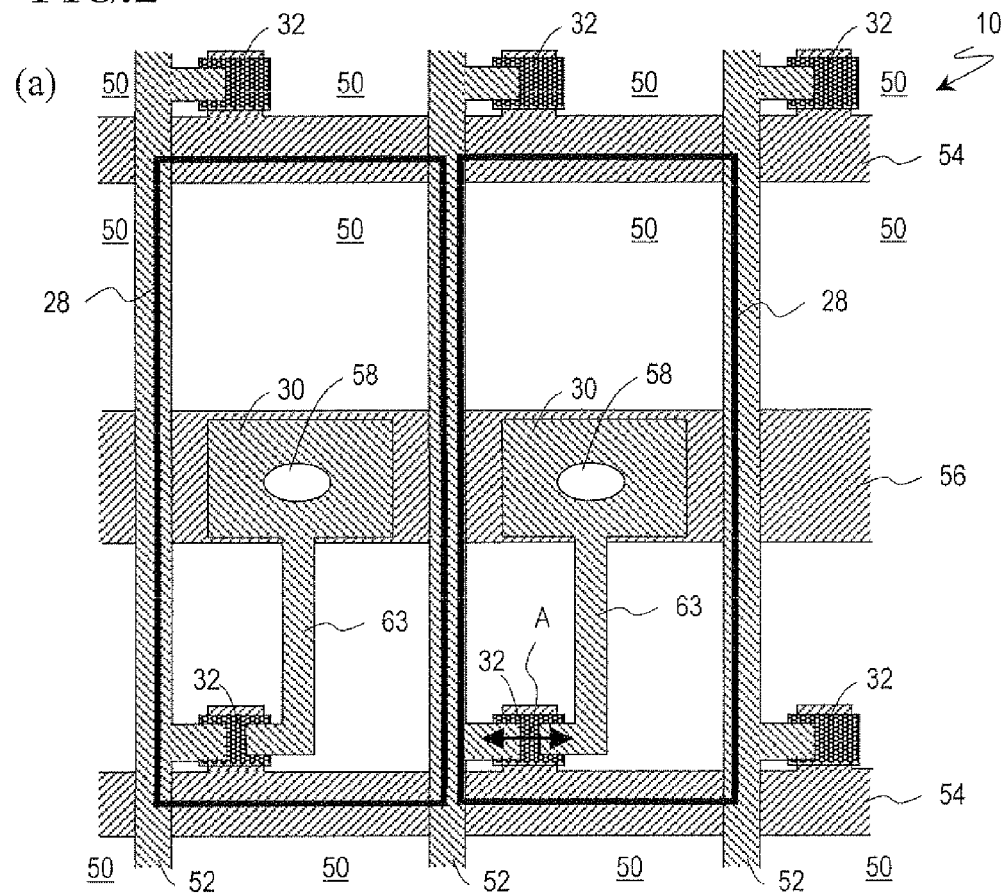
FIG. 2 Diagrams specifically illustrating the construction of a pixel region and a reflection section of Embodiment 1, where (a) is a plan view showing a portion of a pixel region as viewed from above the display surface, and (b) is a plan view schematically showing the construction of a reflection section of a liquid crystal display device.
Figure 2:
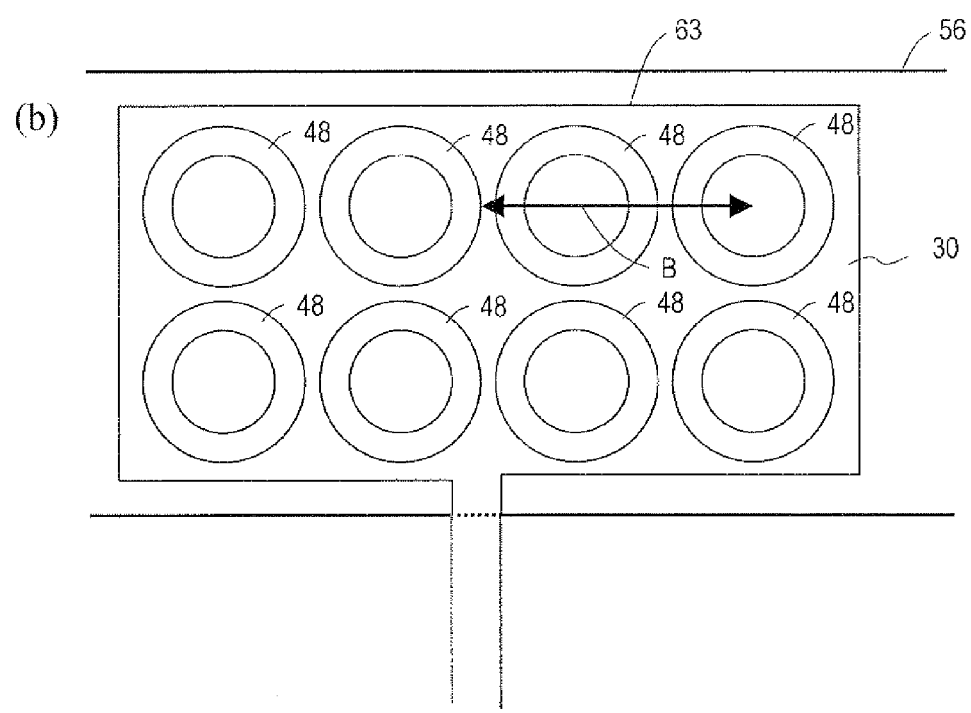

FIG. 2 is a plan view more specifically showing the construction of the pixel region and the reflection section 30 in the liquid crystal display device 10.

FIG. 2(a) is a plan view of a portion of a pixel region of the liquid crystal display device 10, as seen from above the display surface 40. As shown in the figure, a plurality of pixels 50 (rectangular portions denoted by bold lines) are provided in a matrix shape on the liquid crystal display device 10. The aforementioned reflection section 30 and TFT section 32 are formed in each pixel 50.

In the border of the pixel 50, source lines 52 extend along the column direction (the vertical direction in the figure), and gate lines (gate metal layers) 54 extend along the row direction (the horizontal direction in the figure). In the central portion of the pixel 50, a Cs line (Cs metal layer) 56 extends along the row direction. In the interlayer insulating layer 26 of the reflection region 30, a contact hole 58 for connecting the pixel electrode 28 and the drain electrode of the TFT is formed. The Cs line 56, paired with the pixel electrode, forms a storage capacitor.

FIG. 2(b) is a plan view schematically showing the construction of the reflection section 30 above the Cs line 56. The contact hole 58 shown in FIG. 2(a) is omitted from this figure. As shown in the figure, a plurality of circular recesses 48 are formed in the reflection section 30. As will be described later, a reflective layer is formed in an upper portion of the reflection section 30, and the surface of the recesses 48 is formed as the surface of the reflective layer. The reflective layer 63 is connected to the drain electrode of the TFT in the TFT section 32. Thus, by forming many recesses 48 in the reflection section 30, the angle θ can be made 20 degrees or less in greater portions of the reflection surface. Therefore, it is possible to improve the reflection efficiency in the reflection section.

Although only eight recesses 48 are shown in the figure for a better understanding of the construction, the number of the recesses 48 is not limited to eight, but there may be more recesses 48. The recesses 48 do not have to be arranged regularly in the vertical and horizontal direction as shown in the figure, but may be arranged randomly or with irregular spacing. According to the present embodiment, many recesses 48 can be formed as closely together as possible by a method to be described later.

Next, referring to FIG. 3, the construction of the reflection section 30 and the TFT section 32 will be described in greater detail.

FIG. 3(a) shows a cross section of the recess 48 in the reflection section 30 (a cross section of a portion shown by arrow B in FIG. 2(b)). As shown in the figure, the Cs metal layer (metal layer) 56, a gate insulating layer 61, a semiconductor layer 62, and a reflective layer 63 are stacked in the reflection section 30. The semiconductor layer 62 includes an intrinsic amorphous silicon layer (Si(i) layer), and an n⁺ amorphous silicon layer (Si(n⁺) layer) doped with phosphorus.

The Cs metal layer 56 in the reflection section 30 includes recesses (or openings) 57 formed therein as shown in the figure, and protrusions 69 of the Cs metal layer 56 are formed between the recesses 57. The recesses 48 of the reflective layer 63 are formed, reflecting the shape of the recesses 57 and the protrusions 69 of the Cs metal layer 56. The semiconductor layer 62 may possibly be absent in the reflection section 30.

Figure 3:
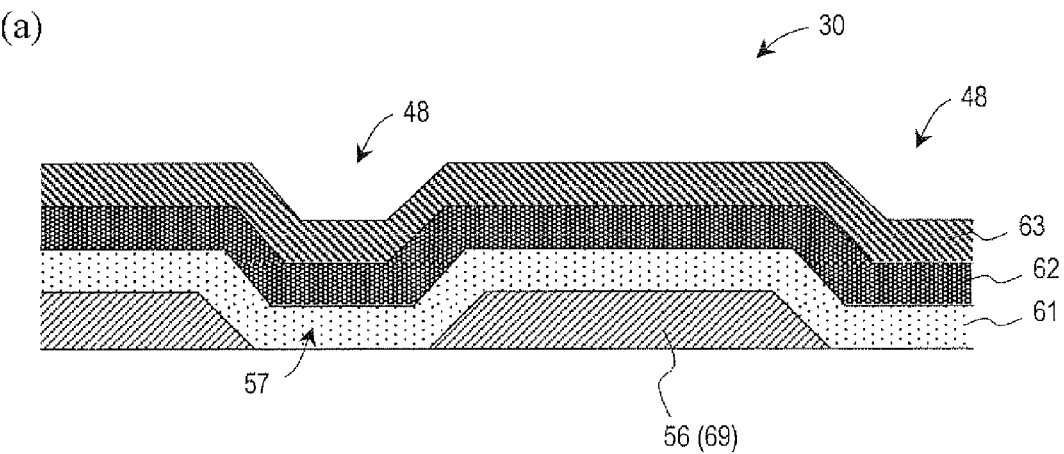
FIG. 3 Cross-sectional views showing the construction of a reflection section and a TFT section of Embodiment 1 where (a) shows the construction of a reflection section, and (b) shows the construction of a TFT section.
Figure 3:
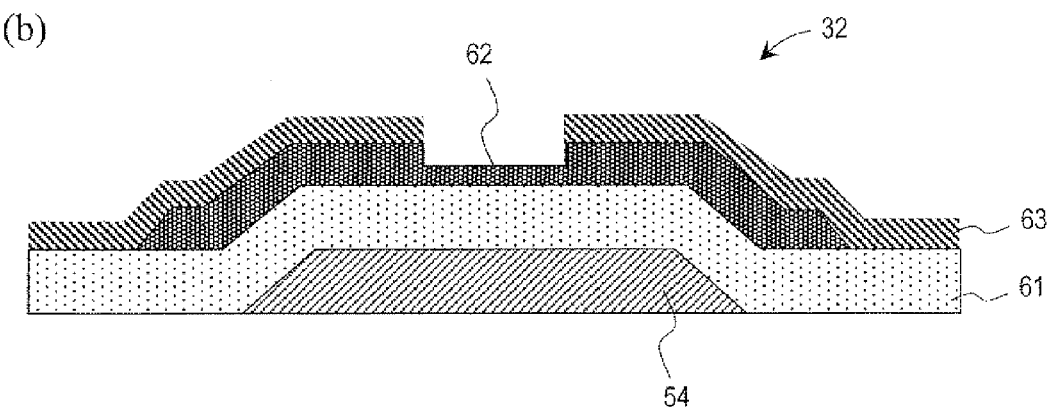

FIG. 3(*b*) is a cross-sectional view showing the construction of the gate metal layer (metal layer) 54, the gate insulating layer 61, the semiconductor layer 62, and the reflective layer 63 in the TFT section 32. The gate metal layer 54 in the TFT section 32 is formed concurrently with and from the same member as the Cs metal layer 56 of the reflection section 30. Similarly, the gate insulating layer 61, the semiconductor layer 62, and the reflective layer 63 of the TFT section 32 are formed concurrently with and from the same members as the gate insulating layer 61, the semiconductor layer 62, and the reflective layer 63 of the reflection section 30, respectively.

Figure 4:
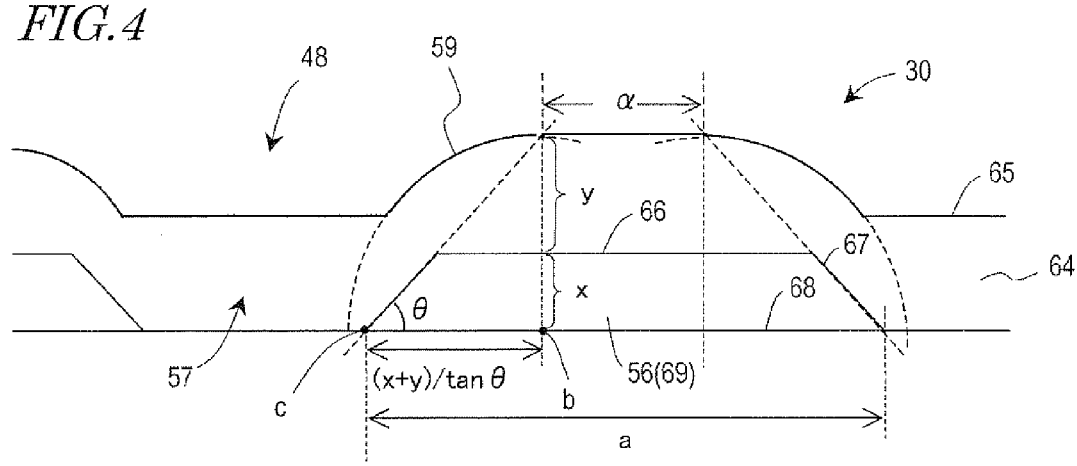
FIG. 4 A diagram illustrating a method of obtaining the width of a protrusion of a Cs metal layer in Embodiment 1.

Next, using FIG. 4, the construction of the reflection section 30 according to the present embodiment will be described in greater detail. FIG. 4 is a diagram showing, in a simplified manner, the cross-sectional structure of the reflection section 30 shown in FIG. 3(*a*) so as to illustrate the width of the bottom surface of the protrusion 69 of the Cs metal layer 56, the thickness thereof, the slope tilt angle thereof, and the relationship thereof with the flat portion in the reflective layer 63. In the figure, the gate insulating layer 61, the semiconductor layer 62 and the reflective layer 63 are not shown individually, but these three layers are collectively designated as upper three layers 64.

As shown in the figure, recesses/protrusions reflecting the shape of the Cs metal layer 56 are formed on a surface (the surface of the reflective layer) 65 of the upper three layers 64 in the reflection section 30. Where a denotes the width of a bottom surface 68 of the protrusion 69, x the distance between the bottom surface 68 and an upper surface 66 of the protrusion 69 (the thickness of the protrusion 69), θ the tilt angle of the slope 67 of the protrusion 69 with respect to the bottom surface 68, and y the thickness of the upper three layers 64, the width a of the bottom surface 68 can be expressed by Expression (1) below.

$$a = 2(x+y)/\tan\theta \quad (1)$$

Expression (1) was obtained as follows. First, the foot b is obtained for a perpendicular that is drawn down to the bottom surface 68 from a point where the extension of slope 67 intersects with the surface 65 of the upper three layers 64. While a curved surface reflecting the shape of the slope 67 is formed on the surface 65 of the upper three layers 64 stacked over the protrusion 69, the cross-sectional shape of the curved surface is herein represented by a cross-sectional curve 59. With the cross-sectional curve 59 being considered a circular arc, it was assumed that the center of a circle containing the circular arc is the center of the stacking of the upper three layers 64, and that the center of the stacking is located at the foot b of the perpendicular. Then, the distance between the intersection point c between the slope 67 and the bottom surface 68 and the foot b of the perpendicular is $(x+y)/\tan\theta$.

Then, the distance of the flat portion on the surface 65 of the upper three layers 64 formed over the protrusion 69 was denoted as α. While α is also the distance between upper edges of the two cross-sectional curves 59 over the protrusion 69, α is herein set to 0 herein, thus obtaining Expression (1) above.

The value α being 0 means that no flat portion is formed on the surface 65 of the upper three layers 64 over the protrusion 69. Therefore, if the width a of the protrusion 69 is set according to Expression (1), no flat portion is formed on the surface 65. Of course, even when employing a value smaller than the width a thus obtained, there is obtained the surface 65 with no flat portion. In other words, there is obtained the surface 65 with no flat portion also when a satisfying Inequality (2) below is used as the width of the protrusion 69.

$$a \leq 2(x+y)/\tan\theta \quad (2)$$

In the reflection section 30 of the present embodiment, the protrusion 69 is formed so that the width a satisfies Inequality (2). Therefore, no flat portion is formed on the surface of the reflective layer 63 over the protrusion 69, and it is thus possible to improve the light reflection efficiency in the reflection section 30 as compared with a liquid crystal display device having a flat portion. It is not necessary that the widths a of all the protrusions 69 in the reflection section 30 satisfy Inequality (2), but the reflection efficiency can be improved if at least one width a satisfies Inequality (2). With such setting of the width a, it is possible to reduce the interval between the plurality of recesses 48 formed in the reflective layer 63. Thus, the recesses 48 can be formed closely together, and it is then possible to form many surfaces where the tilt is 20 degrees or less on the surface of the reflective layer 63. Therefore, it is possible to obtain the reflection section 30 with a higher reflection efficiency.

In Embodiment 1, a preferred range of the thickness x of the protrusion 69, that of the thickness y of the upper three layers 64, and that of the tilt angle θ are 200 to 500 nm, 500 to 900 nm and 10 to 90°, respectively. Table 2 shows values of the width a obtained by using Expression (1) in a case where x=200 nm, y=300 nm and θ=10 to 90° (the first case: MIN), a case where x=500 nm, y=900 nm and θ=10 to 90° (the second case: MAX), and a case where x=350 nm, y=600 nm and θ=10 to 90° (the third case: MID).

TABLE 2

| x [nm] | y [nm] | θ [deg.] | θ [rad.] | tan θ | a [μm] |
|---|---|---|---|---|---|
| 200 (MIN) | 300 (MIN) | 10 | 0.175 | 0.176 | 5.67 |
| | | 15 | 0.262 | 0.268 | 3.73 |
| | | 20 | 0.349 | 0.364 | 2.75 |
| | | 30 | 0.524 | 0.577 | 1.73 |
| | | 40 | 0.698 | 0.839 | 1.19 |
| | | 50 | 0.873 | 1.192 | 0.84 |
| | | 60 | 1.047 | 1.732 | 0.58 |
| | | 70 | 1.222 | 2.747 | 0.36 |
| | | 80 | 1.396 | 5.671 | 0.18 |
| | | 90 | 1.571 | — | — |
| 500 (MAX) | 900 (MAX) | 10 | 0.175 | 0.176 | 15.88 |
| | | 15 | 0.262 | 0.268 | 10.45 |
| | | 20 | 0.349 | 0.364 | 7.69 |
| | | 30 | 0.524 | 0.577 | 4.85 |
| | | 40 | 0.698 | 0.839 | 3.34 |
| | | 50 | 0.873 | 1.192 | 2.35 |
| | | 60 | 1.047 | 1.732 | 1.62 |
| | | 70 | 1.222 | 2.747 | 1.02 |
| | | 80 | 1.396 | 5.671 | 0.49 |
| | | 90 | 1.571 | — | — |
| 350 (MID) | 600 (MID) | 10 | 0.175 | 0.176 | 10.78 |
| | | 15 | 0.262 | 0.268 | 7.09 |
| | | 20 | 0.349 | 0.364 | 5.22 |
| | | 30 | 0.524 | 0.577 | 3.29 |
| | | 40 | 0.698 | 0.839 | 2.26 |
| | | 50 | 0.873 | 1.192 | 1.59 |

TABLE 2-continued

| x [nm] | y [nm] | θ [deg.] | θ [rad.] | tan θ | a [um] |
|---|---|---|---|---|---|
| | | 60 | 1.047 | 1.732 | 1.10 |
| | | 70 | 1.222 | 2.747 | 0.69 |
| | | 80 | 1.396 | 5.671 | 0.34 |
| | | 90 | 1.571 | — | — |

The first case is a case where the thickness x of the protrusion 69 and the thickness y of the upper three layers 64 are set to smallest values that can be used with the reflection section 30, and the second case is a case where x and y are set to largest values that can be used. The third case is a case where x and y are set to intermediate values between those in the first case and those in the second case.

As can be seen from Table 2, 15.88 being the maximum value of a is obtained when x=500 nm, y=900 nm and θ=10°. Therefore, if the width of the bottom surface a of the protrusion 69 is set to 15.88 μm or less, it is possible to ensure that no flat portion is formed on the surface 65 of the reflective layer 63, irrespective of the selection of the thickness of each layer and the angle of the slope 67. Thus, it is possible to increase the reflection efficiency by the reflective layer 63. Moreover, by employing such a width a, the interval between the recesses 48 in the reflective layer 63 is reduced, and thus the recesses 48 can be formed more closely together. Therefore, it is possible to further enhance the reflection efficiency of the reflection section 30.

In Table 2, the value of the width a where x=200 nm, y=300 nm and θ=50° or more, that where x=500 nm, y=900 nm and θ=80° or more, and that where x=350 nm, y=600 nm and θ=70° or more are smaller than 1.00. However, the width a is appropriately set to 1.00 or more in view of the limitations of the manufacture process. Thus, a preferred range of the width a in the embodiment is 1.00 μm or more and 15.88 μm or less. By appropriately selecting the values of x and y, the tilt angle of the slope 67 can be controlled to be 10° or more and less than 90°.

Next, Table 3 shows the value of a obtained by using Expression (1) in the range of x=200 to 500 nm, y=300 to 900 nm and θ=5 to 20°. A preferred range of the thickness x o the Cs metal layer 56 in the embodiment is 200 to 500 nm, and a preferred range of the thickness y of the upper three layers 64 is 300 to 900 nm. When shaping the Cs metal layer 56, it is not practical to set θ to be less than 10°. Therefore, it is believed that the value of a calculated in the range of x=200 to 500 nm, y=300 to 900 nm and θ=10 to 20° is a more preferred range of the value of a.

TABLE 3

| x [nm] | y [nm] | θ [deg.] | θ [rad.] | tan θ | a [um] |
|---|---|---|---|---|---|
| 200 | 300 | 5 | 0.087 | 0.087 | 11.43 |
| 200 | 300 | 10 | 0.175 | 0.176 | 5.67 |
| 200 | 300 | 15 | 0.262 | 0.268 | 3.73 |
| 200 | 300 | 20 | 0.349 | 0.364 | 2.75 |
| 200 | 900 | 5 | 0.087 | 0.087 | 25.15 |
| 200 | 900 | 10 | 0.175 | 0.176 | 12.48 |
| 200 | 900 | 15 | 0.262 | 0.268 | 8.21 |
| 200 | 900 | 20 | 0.349 | 0.364 | 6.04 |
| 500 | 300 | 5 | 0.087 | 0.087 | 18.29 |
| 500 | 300 | 10 | 0.175 | 0.176 | 9.07 |
| 500 | 300 | 15 | 0.262 | 0.268 | 5.97 |
| 500 | 300 | 20 | 0.349 | 0.364 | 4.40 |
| 500 | 900 | 5 | 0.087 | 0.087 | 32.00 |
| 500 | 900 | 10 | 0.175 | 0.176 | 15.88 |
| 500 | 900 | 15 | 0.262 | 0.268 | 10.45 |
| 500 | 900 | 20 | 0.349 | 0.364 | 7.69 |

The maximum value of a in this range is 15.88 μm, which is the value when x=500 nm, y=900 nm and θ=10°, and the minimum value is 2.75 μm, which is the value when x=200 nm, y=300 nm and θ=20°. Thus, a more preferred range of a is 2.75 μm or more and 15.88 μm or less.

In a conventional liquid crystal display device, recesses are formed in portions where the gate layer 102, the gate insulating layer 104 and the semiconductor layer 106 have been removed, and the bottom surfaces of the recesses are therefore formed at deep positions. Therefore, the inner surface of each recess has a large tilt angle, thus making it difficult to form within the recess a large number of effective reflection surfaces having a tilt of 20 degrees or less. Moreover, these recesses are formed by forming the gate layer 102, the gate insulating layer 104, and the semiconductor layer 106, and then removing these layers altogether. Thus, it is not possible to control the shape of the inner surface of each recess and the tilt angle of the slope, making it difficult to increase the effective reflection surfaces.

According to the present embodiment, the recesses (dents) of the reflective layer 63 are formed by reflecting the controlled shape of the Cs metal layer 56, and it is therefore possible to easily form relatively shallow dents in the reflective layer, and to improve the reflection efficiency at the surface of the reflective layer. Since the shape, the depth, the slope tilt angle, etc., of the recesses 48 can easily be adjusted, the recesses 48 of the reflective layer 63 can easily be formed with a slope tilt angle of 20 degrees or less. Therefore, it is possible to increase the area of the effective reflection surface without increasing the manufacturing cost.

According to the present embodiment, the width of the protrusion 69 of the Cs metal layer 56 can be set to be as small as practically possible. Then, more recesses 57 of the Cs metal layer 56 can be arranged in the reflection section 30, thus forming more recesses 48 in the reflective layer 63. This increases the area of the surface where the tilt is 20 degrees or less on the surface of the reflective layer 63, thereby improving the reflection efficiency. Furthermore, since it is possible to reduce the area of the flat portion of the surface of the reflective layer 63, it is possible to further improve the reflection efficiency.

Next, a method for manufacturing the TFT substrate 12 according to the present embodiment will be described.

Figure 5:
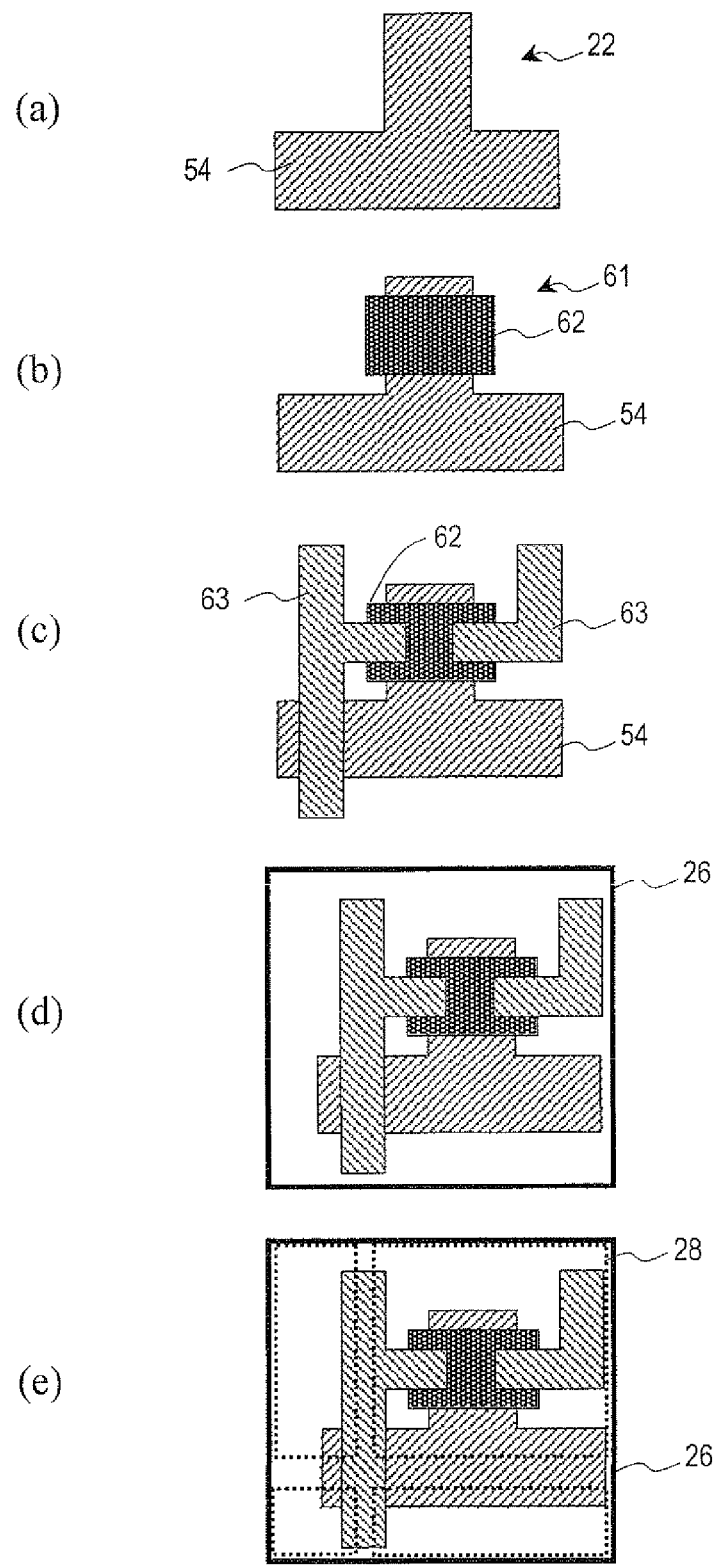
FIG. 5 Plan views showing a method for manufacturing a TFT section of Embodiment 1.
Figure 6:
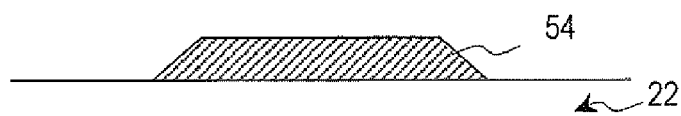
FIG. 6 Cross-sectional views showing a method for manufacturing a TFT section of Embodiment 1.
Figure 6:
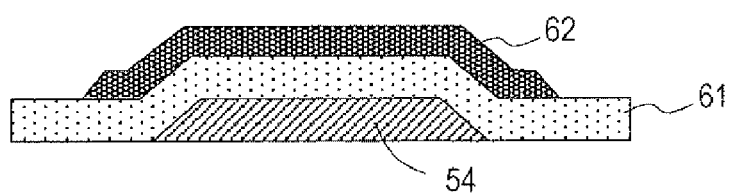
Figure 6:
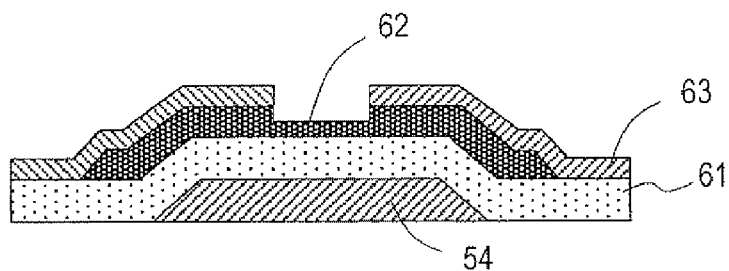
Figure 6:
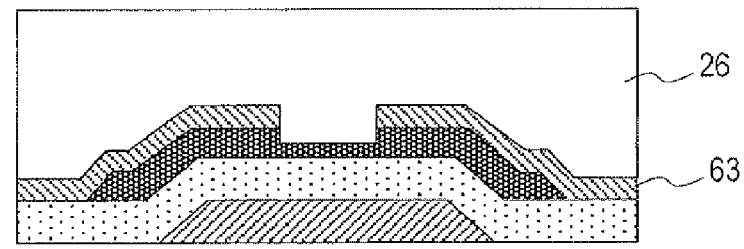
Figure 6:
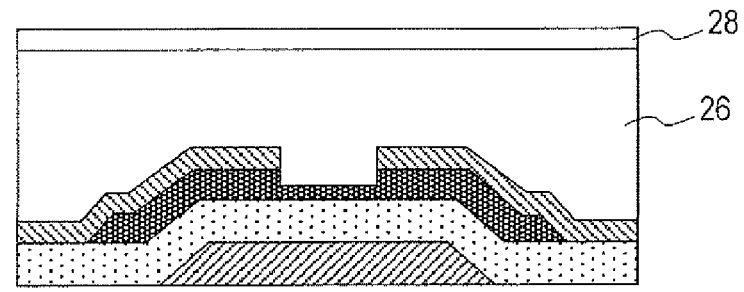

FIG. 5 is plan views showing a method for manufacturing the TFT substrate 12 in the TFT section 32. FIG. 6 is cross-sectional views showing a method for manufacturing the TFT substrate 12 in the TFT section 32, showing a cross section of a portion shown by arrow A in FIG. 2(a).

As shown in FIG. 5(a) and FIG. 6(a), first, by a method such as sputtering, a thin metal film of Al (aluminum) is formed on the transparent substrate 22 having been cleaned. Note that, other than Al, this thin metal film may be formed by using Ti (titanium), Cr (chromium), Mo (molybdenum), Ta (tantalum), W (tungsten), or an alloy thereof, etc., or formed from a multilayer body of a layer of such materials and a nitride film.

Thereafter, a resist film is formed on the thin metal film, and after forming a resist pattern through an exposure and development step, a dry or wet etching is performed to form the gate metal layer (metal layer) 54. The gate metal layer 54 has a thickness of 200 to 500 nm, for example.

Thus, the gate metal layer 54 which is formed by photolithography technique serves as a gate electrode of the TFT. Note that, in this step, the gate lines (gate metal layer) 54 shown in FIG. 2(a) and the Cs metal layer 56 of the reflection section 30 shown in FIG. 3(a) are also formed from the same metal concurrently.

Next, as shown in FIG. 5(b) and FIG. 6(b), by using P-CVD technique and a gaseous mixture of $SiH_4$, $NH_3$, and $N_2$, the gate insulating layer 61 composed of SiN (silicon nitride) is formed across the entire substrate surface. The gate insulating layer 61 may also be composed of $SiO_2$ (silicon oxide), $Ta_2O_5$ (tantalum oxide), $Al_2O_3$ (aluminum oxide), or the like. The thickness of the gate insulating layer 61 is 300 to 500 nm, for example. In this step, the gate insulating layer 61 of the reflection section 30 shown in FIG. 3(a) is also formed concurrently.

Next, on the gate insulating layer 61, an amorphous silicon (a-Si) (Si(i) film) film and an $n^+$a-Si film (Si ($n^+$) film) obtained by doping amorphous silicon with phosphorus (P). The thickness of the a-Si film is 30 to 300 nm, for example, and the thickness of the $n^+$a-Si film is 20 to 100 nm, for example. Thereafter, these films are shaped by photolithography technique, whereby the semiconductor layer 62 is formed. In this step, the semiconductor layer 62 of the reflection section 30 shown in FIG. 3(a) is also formed concurrently.

Next, as shown in FIG. 5(c) and FIG. 6(c), a thin metal film of Al or the like is formed across the entire substrate surface by sputtering technique or the like, and a photolithography technique is performed to form the reflective layer 63. For the thin metal film, the materials which are mentioned above as materials for the gate metal layer 54 may be used. The thickness of the reflective layer 63 is 30 to 1000 nm, for example.

In the TFT section 32, the reflective layer 63 forms a source electrode and a drain electrode of the TFT. At this time, the source line 52 in FIG. 2(a) is also formed as a portion of the reflective layer 63, and the reflective layer 63 of the reflection section 30 shown in FIG. 3(a) is also formed concurrently.

Next, as shown in FIG. 5(d) and FIG. 6(d), a photosensitive acrylic resin is applied by spin-coating, whereby the interlayer insulating layer (interlayer resin layer) 26 is formed. The thickness of the interlayer insulating layer 26 is 0.3 to 5 μm, for example. Although a thin film such as $SiN_x$ or $SiO_2$ may be formed by P-CVD technique as a protection film between the reflective layer 63 and the interlayer insulating layer 26, such is omitted from the figure. The thickness of the protection film is 50 to 1000 nm, for example. The interlayer insulating layer 26 and the protection film are formed not only on the TFT section 32, but also on the entire upper surface of the transparent substrate 22 including the reflection section 30.

Next, as shown in FIG. 5(e) and FIG. 6(e), on the interlayer insulating layer 26, a transparent electrode film such as ITO or IZO is formed by sputtering technique or the like. This transparent electrode film is pattern shaped by photolithography technique, whereby the pixel electrode 28 is formed. The pixel electrode 28 is formed not only on the TFT section 32 but also on the entire upper surface of the pixel including the reflection section 30.

Next, by using FIG. 7 and FIG. 8, a method for manufacturing the TFT substrate 12 in the reflection section 30 will be described.

Figure 7:
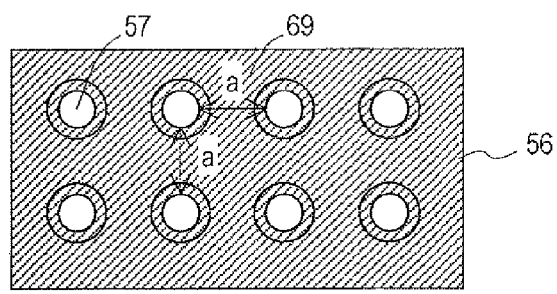
FIG. 7 Plan views showing a method for manufacturing a reflection section of Embodiment 1.
Figure 7:
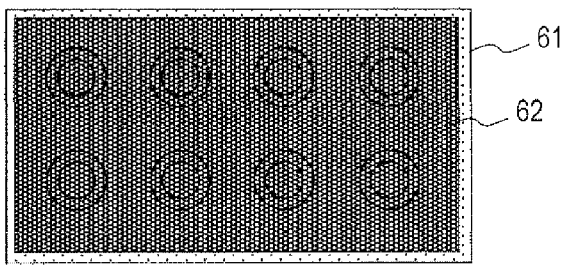
Figure 7:
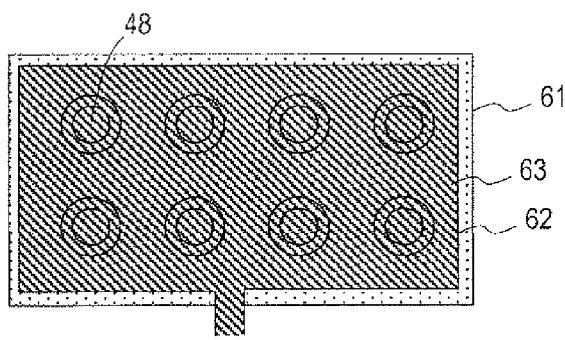
Figure 7:
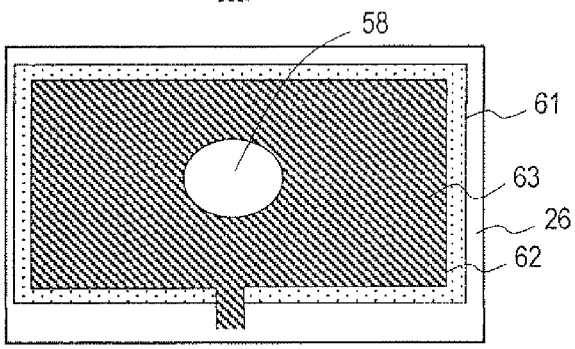
Figure 7:
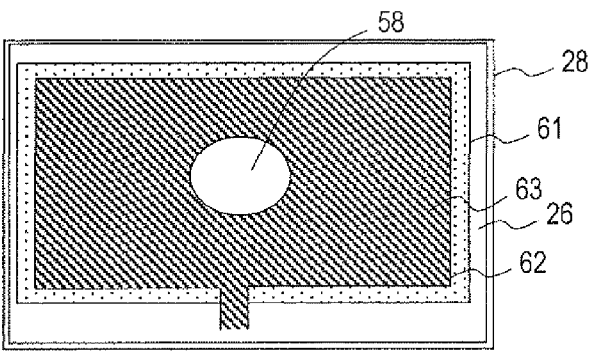
Figure 8:
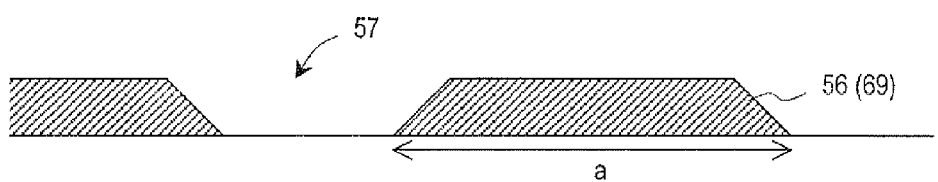
FIG. 8 Cross-sectional views showing a method for manufacturing a reflection section of Embodiment 1.
Figure 8:
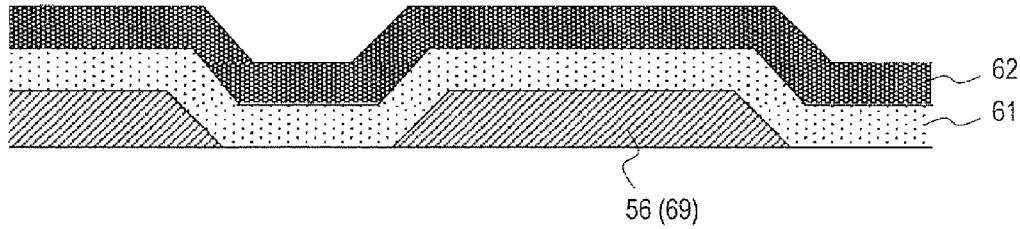
Figure 8:
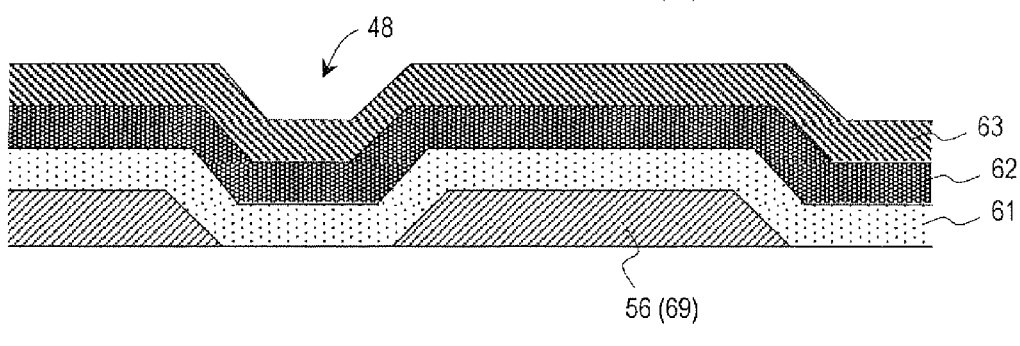
Figure 8:
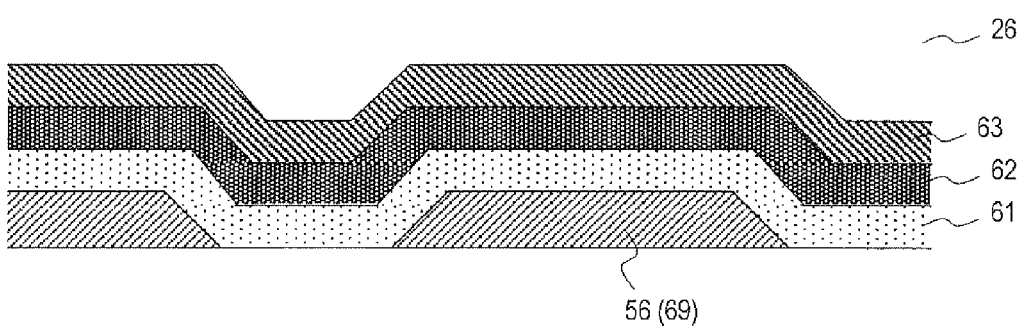
Figure 8:
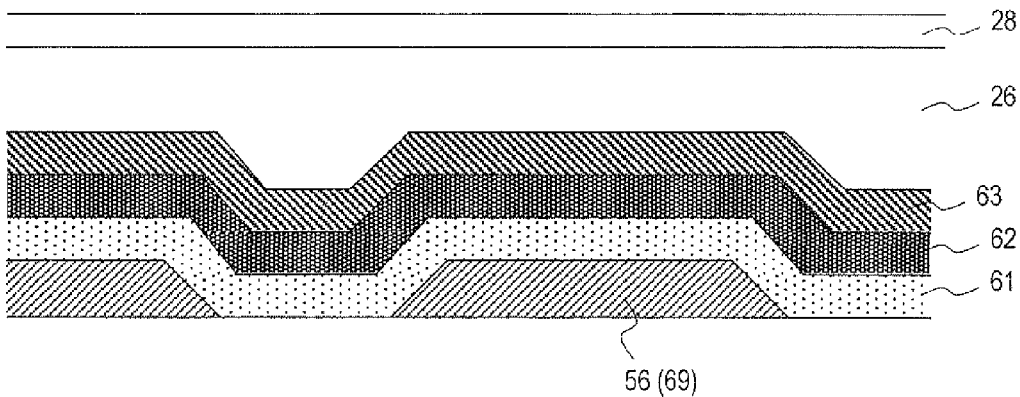

FIG. 7 is a plan view showing a method for manufacturing the TFT substrate 12 in the reflection section 30. FIG. 8 is a cross-sectional view showing a method for manufacturing the TFT substrate 12 in the reflection section 30, showing a cross section of a portion shown by arrow B in FIG. 2(b). She steps shown at (a) to (e) in FIG. 7 and FIG. 8 correspond to the steps of (a) to (e) in FIG. 5 and FIG. 6, respectively.

As shown in FIG. 7(a) and FIG. 8(a), the Cs metal layer 56 in the reflection section 30 is formed, by a similar method, concurrently with and from the same metal as the gate metal layer 54 in the TFT section 32. When the thin metal film is shaped by photolithography technique, a plurality of recesses 57 are formed in the Cs metal layer 56. A value calculated by Expression (1) above or a value within a range obtained by Expression (2) is used as the width a of the protrusion 69 formed between two recesses 57.

Next, as shown in FIG. 7(b) and FIG. 8(b), the gate insulating layer 61 is formed by a method similar to that for the TFT section 32, and thereafter the semiconductor layer 62 is formed. While the semiconductor layer 62 is formed in the TFT section 32, the semiconductor layer 62 may possibly be absent in the reflection section 30 by, for example, removing the semiconductor material in the patterning process.

Next, As shown in FIG. 7(c) and FIG. 8(c), the reflective layer 63 is formed on the semiconductor layer 62 (on the gate insulating layer 61 if the semiconductor layer 62 is not formed) by a method similar to that for the TFT section 32. On the surface of the reflective layer 63, the recesses 48 are formed, reflecting the recesses 57 and the protrusions 69 of the Cs metal layer 56.

Next, as shown in FIG. 7(d) and FIG. 8(d), the interlayer insulating layer 26 is formed from photosensitive acrylic resin. Thereafter, through a development process using an exposure apparatus, the contact hole 58 is formed near the center of the reflection section 30.

Next, as shown in FIG. 7(e) and FIG. 8(e), the pixel electrode 28 is formed. In the reflection section 30, the pixel electrode 28 is formed above the interlayer insulating layer 26 and the contact hole 58, such that the metal member of the pixel electrode 28 is in contact with the reflective layer 63 via the contact hole 58. As a result, the drain electrode of the TFT in the TFT section 32 is electrically connected with the pixel electrode 28 via the contact hole 58.

In the embodiment above, the semiconductor layer 62 may possibly be absent in the reflection section 30. In such a case, the aforementioned value y is regarded as the total thickness of the gate insulating layer 61 in the reflection section 30 and the reflective layer 63.

Embodiment 2

Next, a second embodiment of the liquid crystal display device of the present invention will be described. The second embodiment is directed to the liquid crystal display device 10 shown in FIG. 1, except that the reflection section 30 is replaced by a reflection section 30' to be described below. Otherwise, the construction is the same as that of Embodiment 1. Therefore, only the construction of the reflection section 30' will be described below. In the following description, like elements to those of Embodiment 1 will be denoted by like reference numerals and will not be described below.

Figure 9:
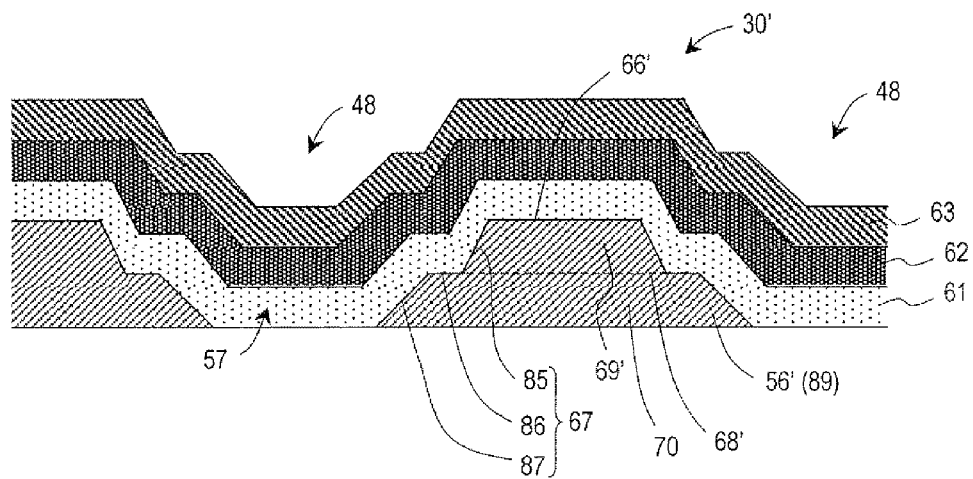
FIG. 9 A cross-sectional view showing the construction of a reflection section of Embodiment 2.

FIG. 9 shows a cross section of the recess 48 in the reflection section 30' of Embodiment 2 (a cross section of a portion shown by arrow B in FIG. 2(b)). As shown in the figure, the Cs metal layer (metal layer) 56', the gate insulating layer 61, the semiconductor layer 62 and the reflective layer 63 are stacked in the reflection section 30'.

A plurality of recesses (or openings) 57 are formed in the Cs metal layer 56' in the reflection section 30' as shown in the figure, and a protruding portion 89 of the Cs metal layer 56' is formed between the recesses 57. The slope 67 of the protruding portion 89 is formed with a step, and the slope 67 includes an upper slope 85, a flat portion 86 and a lower slope 87. The flat portion 86 is formed generally parallel to the substrate surface. A portion of the protruding portion 89 that is above a plane that includes the flat portion 86 is referred to as an upper portion 69', and a portion below the plane is referred to as a lower portion 70. The recesses 48 of the reflective layer 63 are formed according to the shape of the opening 57 and the protruding portion 89 of the Cs metal layer 56'. The semiconductor layer 62 may possibly be absent in the reflection section 30'.

The reflection section 30' is manufactured by a method similar to that described above using FIGS. 7 to 8. Note however that in the step of shaping the Cs metal layer 56, the protruding portion 89 is formed so that the width of the bottom surface of the upper portion 69' has a value that satisfies the same condition for the width of the bottom surface of the protrusion 69 in Embodiment 1. This method of determining the width of the bottom surface of the upper portion 69' will be described using FIG. 10.

Figure 10:
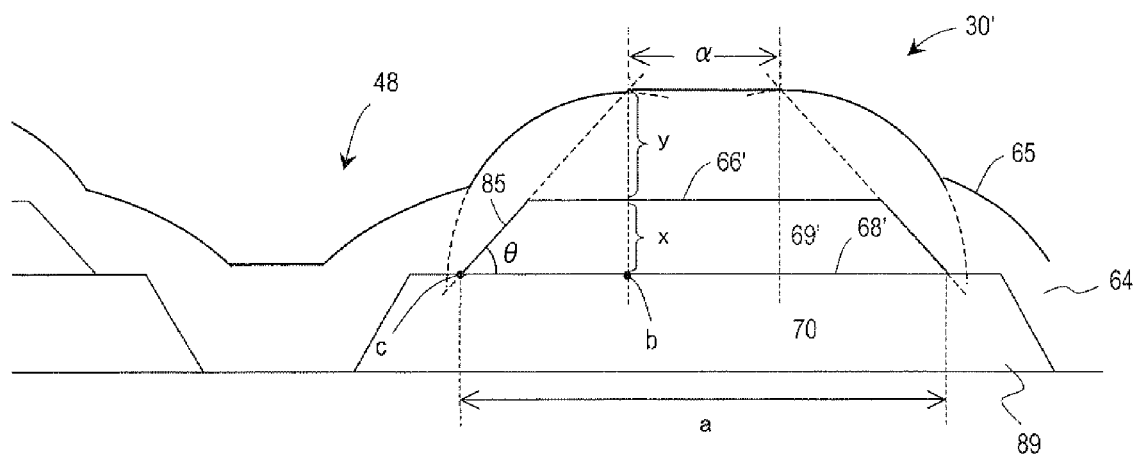
FIG. 10 A diagram illustrating a method of obtaining the width of a protrusion of a Cs metal layer in Embodiment 2.

FIG. 10 is a diagram showing, in a simplified manner, the cross-sectional structure of the reflection section 30' shown in FIG. 9 so as to illustrate the width of the bottom surface of the protruding portion 89 of the Cs metal layer 56, the thickness thereof, the slope tilt angle thereof, and the relationship thereof with the flat portion in the reflective layer 63. In the figure, the gate insulating layer 61, the semiconductor layer 62 and the reflective layer 63 are not shown individually, but these three layers are collectively referred to as the upper three layers 64.

As shown in the figure, recesses/protrusions reflecting the shape of the Cs metal layer 56' are formed on a surface (the surface of the reflective layer) 65 of the upper three layers 64 in the reflection section 30'. Where a denotes the width of a bottom surface 68' of the upper portion 69' of the protruding portion 89, x the distance between the bottom surface 68' and an upper surface 66' of the upper portion 69' (the thickness of the upper portion 69'), θ the tilt angle of the slope (upper slope) 85 of the upper portion 69' with respect to the bottom surface 68', and y the thickness of the upper three layers 64, the width a of the bottom surface 68' is set to a value that satisfies Expression (1) above or a value satisfies Inequality (2), The method of obtaining Expression (1) and Inequality (2) is as described above in Embodiment 1. That is, the width of the bottom surface of the upper portion 69' of the protruding portion 89 is determined by the same method as the method of determining the width of the bottom surface of the protrusion 69 in Embodiment 1 (in the determination of the width of the bottom surface, the upper portion 68' of the protruding portion 89 is considered to be corresponding to the protrusion 69 in Embodiment 1).

In Embodiment 2, a preferred range of the thickness x of the upper portion 69', a preferred range of the thickness y of the upper three layers 64, and a preferred range of the tilt angle θ are 50 to 400 nm, 300 to 900 nm and 10 to 90°, respectively. Table 4 shows values of the width a obtained by using Expression (1) in a case where x=50 nm, y=300 nm and θ=10 to 90° (the first case: MIN), a case where x=400 nm, y=900 nm and θ=10 to 90° (the second case: MAX), and a case where x=225 nm, y=600 nm and θ=10 to 90° (the third case: MID).

TABLE 4

| x [nm] | y [nm] | θ [deg.] | θ [rad.] | tan θ | a [μm] |
|---|---|---|---|---|---|
| 50 (MIN) | 300 (MIN) | 10 | 0.175 | 0.176 | 3.97 |
| | | 15 | 0.262 | 0.268 | 2.61 |
| | | 20 | 0.349 | 0.364 | 1.92 |
| | | 30 | 0.524 | 0.577 | 1.21 |
| | | 40 | 0.698 | 0.839 | 0.83 |
| | | 50 | 0.873 | 1.192 | 0.59 |
| | | 60 | 1.047 | 1.732 | 0.40 |
| | | 70 | 1.222 | 2.747 | 0.25 |
| | | 80 | 1.396 | 5.671 | 0.12 |
| | | 90 | 1.571 | — | — |
| 400 (MAX) | 900 (MAX) | 10 | 0.175 | 0.176 | 14.75 |
| | | 15 | 0.262 | 0.268 | 9.70 |
| | | 20 | 0.349 | 0.364 | 7.14 |
| | | 30 | 0.524 | 0.577 | 4.50 |
| | | 40 | 0.698 | 0.839 | 3.10 |
| | | 50 | 0.873 | 1.192 | 2.18 |
| | | 60 | 1.047 | 1.732 | 1.50 |
| | | 70 | 1.222 | 2.747 | 0.95 |
| | | 80 | 1.396 | 5.671 | 0.46 |
| | | 90 | 1.571 | — | — |
| 225 (MID) | 600 (MID) | 10 | 0.175 | 0.176 | 9.36 |
| | | 15 | 0.262 | 0.268 | 6.16 |
| | | 20 | 0.349 | 0.364 | 4.53 |
| | | 30 | 0.524 | 0.577 | 2.86 |
| | | 40 | 0.698 | 0.839 | 1.97 |
| | | 50 | 0.873 | 1.192 | 1.38 |
| | | 60 | 1.047 | 1.732 | 0.95 |
| | | 70 | 1.222 | 2.747 | 0.60 |
| | | 80 | 1.396 | 5.671 | 0.29 |
| | | 90 | 1.571 | — | — |

The first case is a case where the thickness x of the upper portion 69' and the thickness y of the upper three layers 64 are set to smallest values that can be used with the reflection section 30', and the second case is a case where x and y are set to largest values that can be used. The third case is a case where x and y are set to intermediate values between those in the first case and those in the second case.

As can be seen from Table 4, 14.75 being the maximum value of a is obtained when x=400 nm, y=900 nm and θ=10°. Therefore, if the metal layer 56 is formed so that the width of the bottom surface a of the upper portion 69' is 14.75 μm or less, it is possible to ensure that no flat portion is formed on the surface 65 of the reflective layer 63 above the upper portion 69', irrespective of the selection x, y and θ. Thus, it is possible to increase the reflection efficiency by the reflective layer 63.

In Table 4, the value of the width a where x=50 nm, y=300 nm and θ=40° or more, that where x=400 nm, y=900 nm and θ=70° or more, and that where x=225 nm, y=600 nm and θ=60° or more are smaller than 1.00. However, the width a is appropriately set to 1.00 μm or more in view of the limitations of the manufacture process. Thus, a preferred range of the width a in Embodiment 2 is 1.00 μm or more and 14.75 μm or less.

According to the present embodiment, the recesses 48 (dents) of the reflective layer 63 are formed by reflecting the controlled shape of the Cs metal layer 56, and it is therefore possible to easily form relatively shallow dents in the reflective layer, and to improve the reflection efficiency at the surface of the reflective layer. Since the shape, the depth, the slope tilt angle, etc., of the recesses 48 can easily be adjusted, the recesses 48 of the reflective layer 63 can easily be formed with a slope tilt angle of 20 degrees or less. Therefore, it is possible to increase the area of the effective reflection surface without increasing the manufacturing cost.

According to the present embodiment, the width of the protrusion 69 of the Cs metal layer 56 can be set to be as small as practically possible. Then, more recesses 57 of the Cs metal layer 56 can be arranged in the reflection section 30, thus forming more recesses 48 in the reflective layer 63. This increases the area of the surface where the tilt is 20 degrees or less on the surface of the reflective layer 63, thereby improving the reflection efficiency. Furthermore, since it is possible to reduce the area of the flat portion of the surface of the reflective layer 63, it is possible to further improve the reflection efficiency.

Furthermore, Embodiment 2 gives an advantage as follows.

Figure 11:
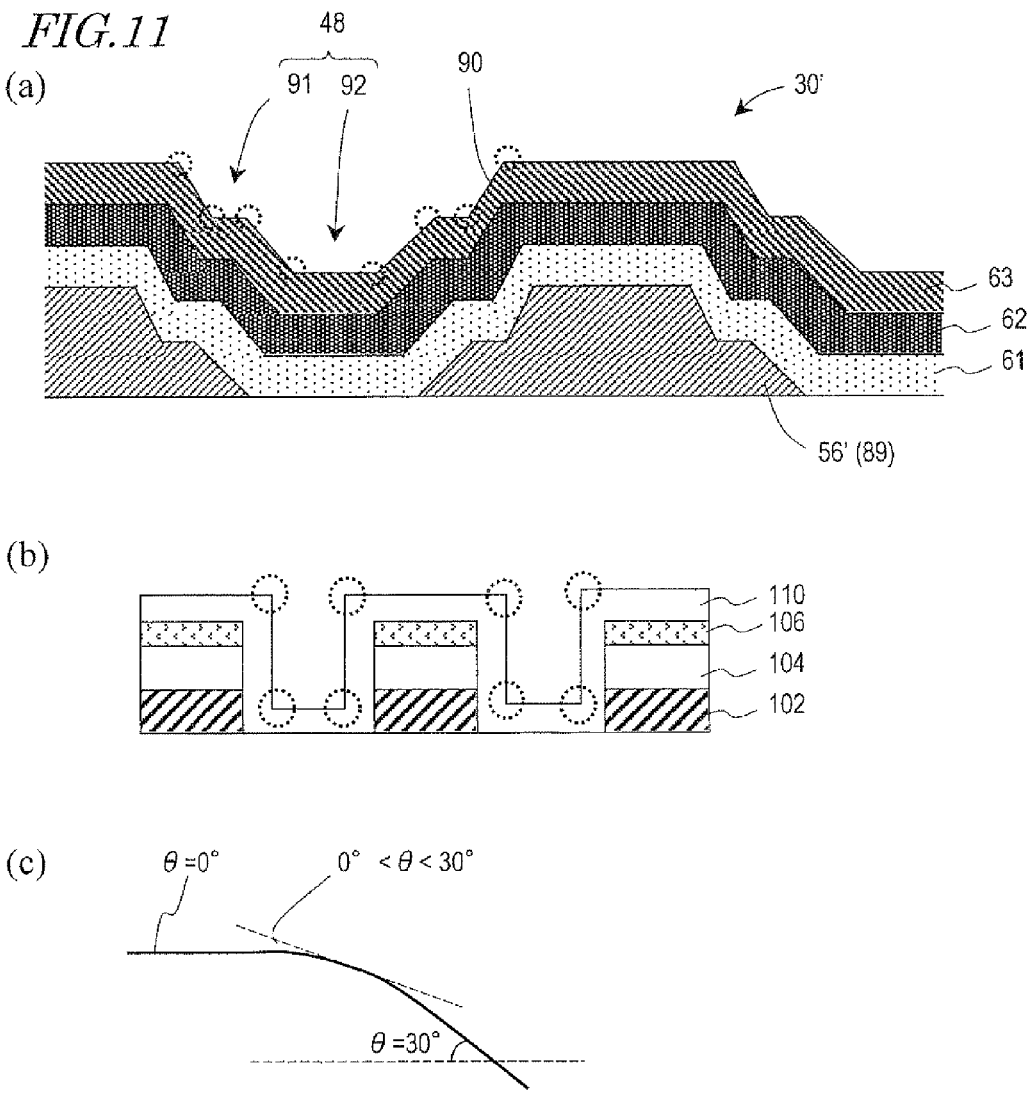
FIG. 11 Schematic diagrams for comparison between the construction of a reflection section of Embodiment 2 and that of a conventional liquid crystal display device, where (a) shows a cross section of the reflection section, (b) shows a cross section of the reflection section of the conventional liquid crystal display device, and (c) shows surface angles at a corner portion of the reflection section.
Figure 13:
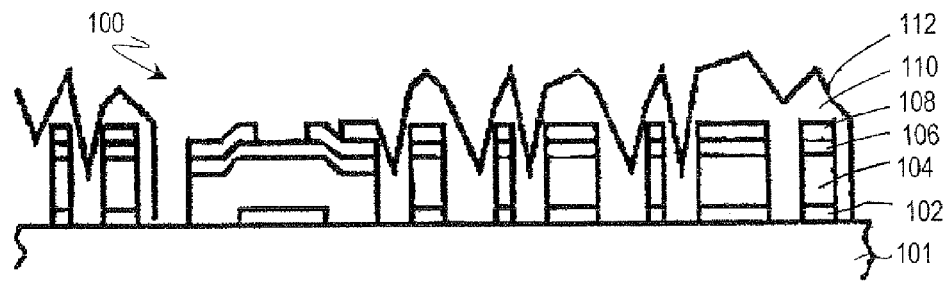
FIG. 13 A cross-sectional view showing an active matrix substrate in a conventional reflection-type LCD.
Figure 14:
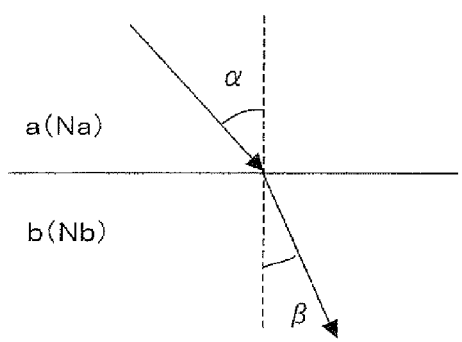
FIG. 14 Diagrams showing a relationship between a tilt of a reflection surface and reflected light in a liquid crystal display device, where (a) shows a relationship between an incident angle α and an outgoing angle β when light enters a medium b having a refractive index Nb from a medium a having a refractive index Na, and (b) shows a relationship between incident light and reflected light as well as the angle of the display surface of the LCD.
Figure 14:
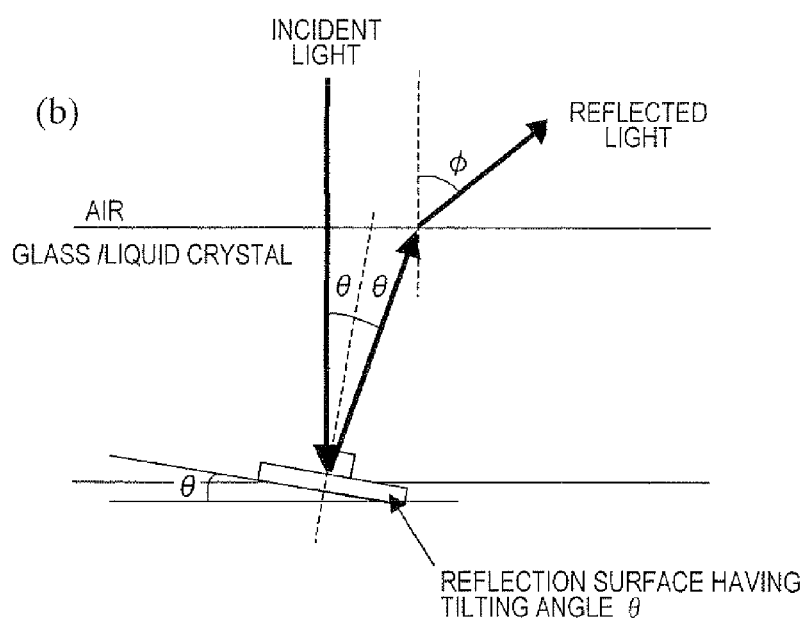

FIG. 11 shows diagrams for comparison between the construction of the reflection section 30' of the present embodiment and that of the reflection section of the conventional liquid crystal display device shown in FIG. 13. FIG. 11(a) schematically shows a cross-sectional structure of the reflection section 30' of the present embodiment, and FIG. 11(b) schematically shows a cross-sectional structure of the reflection section of the conventional liquid crystal display device. As shown in these figures, on the surface of the reflective layer 63 of the present embodiment, there is formed a stepped slope 90, reflecting the slope of the protruding portion 89 of the Cs metal layer 56'. Thus, a recess 91 and a recess 92 located inside the recess 91 are formed in the reflective layer 63. The recess 48 shown in FIG. 2(b) is formed by the recess 91 and the recess 92.

As seen in a cross-sectional shape, each recess 48 includes eight corner portions (portions shown by dotted lines in the figure). In the conventional liquid crystal display device, each recess includes only four corner portions as shown in FIG. 11(b). At the corner portions of the reflective layer, surfaces having an angle greater than degrees with respect to the substrate from the plane parallel to the substrate (represented as being 30 degrees, for example, in this figure) are formed continuously as shown in FIG. 11(c). Therefore, if more recesses are formed in the reflection section, it is possible to form more effective reflection surfaces (surfaces whose angle with respect to the substrate is 20 degrees or less) on the surface of the reflective layer 63.

As can be seen from FIGS. 11(a) and (b), a two-tiered recess having a step therein is formed in the reflective layer 63 of the present embodiment. Therefore, the surface of the reflective layer 63 has more corner portions than the conventional reflection section. Thus, more effective reflection surfaces are formed on the surface of the reflective layer 63, and it is therefore possible to improve the reflection efficiency of the reflection section 30'. Since the recesses 91 and the recesses 92 are formed according to the controlled shape of the Cs metal layer 56', the shape, the depth and the slope tilt angle of the recesses can easily be adjusted.

Although the protruding portion 89 of the Cs metal layer 56' has a two-tiered structure including the upper portion 69' and the lower portion 70 in the present embodiment, the protruding portion 89 may be formed with three or more tiers of steps. Also in such a case, it is assumed that the upper portion 69' of Embodiment 2 is located at the uppermost portion of the protruding portion 89. Therefore, in such a case, the lower portion 70 of the protruding portion 89 has two or more tiers of steps, and the lower slope 87 further includes a stepped slope. Moreover, in such a case, a recess is further formed inside the recess 92, which is formed in the reflective layer 63.

In the embodiment above, the recess 91 and the recess 92 formed on the surface of the reflective layer 63 are assumed to be formed concentrically as viewed in a direction vertical to the substrate. Nevertheless, the present invention is not limited to this, and the recess 91 and the recess 92 may be arranged so that their centers are not aligned with each other. The periphery of the recess 91 and that of the recess 92 may partially overlap each other. Also in these cases, many recesses/protrusions with steps are formed on the surface of the reflective layer 63, whereby it is possible to widen the effective reflection surface.

In the embodiment above, the semiconductor layer 62 may possibly be absent in the reflection section 30'. In such a case, the aforementioned value y is regarded as the total thickness of the gate insulating layer 61 in the reflection section 30' and the reflective layer 63.

Embodiment 3

Hereinafter, with reference to the drawing, a third embodiment of the liquid crystal display device according to the present invention will be described. Like elements to those of Embodiments 1 and 2 will be denoted by like reference numerals and will not be described below.

Figure 12:
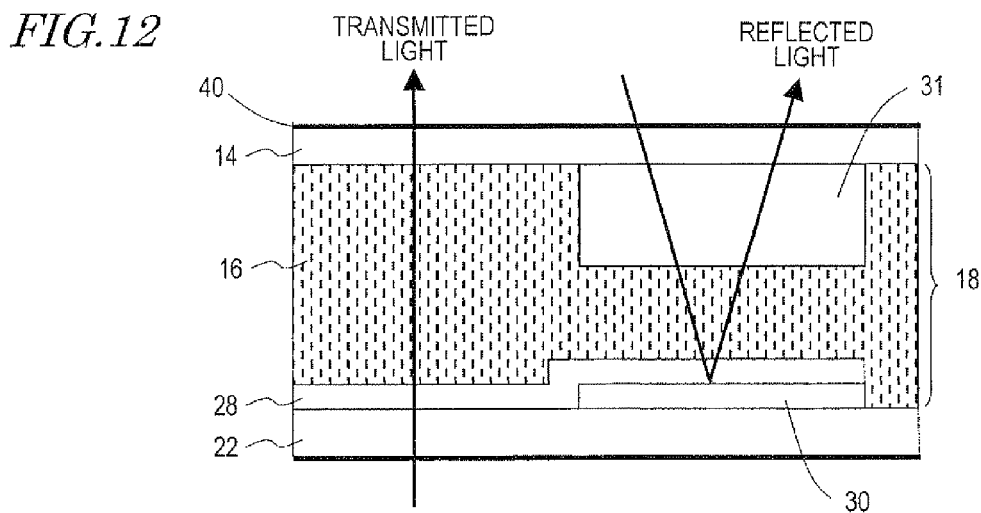
FIG. 12 A cross-sectional view showing a liquid crystal display device of Embodiment 3.

FIG. 12 schematically shows a cross-sectional shape of the liquid crystal display device of the present embodiment. This liquid crystal display device is based on the liquid crystal display devices of Embodiments 1 and 2 from which the interlayer insulating layer 26 is excluded, and is identical to the liquid crystal display devices of Embodiments 1 and 2 except for the points discussed below. Note that, in FIG. 12, the detailed structure of the counter substrate 14 and the TFT section 32 are omitted from illustration.

As shown in the figure, in the present embodiment, the interlayer insulating layer is not formed, and therefore the pixel electrode 28 is formed upon the reflective layer 63 in the reflection section 30 and in the TFT section 32, via an insulating film not shown. The structure and the manufacturing method for the reflection section 30 and the TFT section 32 are the same as in Embodiment 1 except that the interlayer insulating layer 26 is eliminated. The pixel layout and wiring structure in the liquid crystal display device are also similar to what is shown in FIG. 2(a).

Also with this construction, as in Embodiment 1, the effective reflection surfaces of the reflective layer 63 are expanded in area, so that more light can be reflected toward the display surface 40.

Although the recesses 57 of the Cs metal layer 56 are formed in a circular shape in the embodiment above, the recesses 57 may be formed in any of various shapes, including elliptic shapes, polygonal shapes such as triangles and quadrangles, recesses with sawtoothed edges, or combinations thereof. In any case, the width a of the bottom surface of the protrusion 69 of the Cs metal layer 56 (and the upper portion 68' of the protruding portion 89) is the width of the narrowest portion of the protrusion sandwiched between adjacent recesses.

The liquid crystal display device of the present invention encompasses display apparatuses, television sets, mobile phones, etc., in which a liquid crystal panel is utilized. Moreover, although the present embodiments illustrate transflective-type liquid crystal display devices as examples, a reflection-type liquid crystal display device having a similar configuration to the aforementioned reflection section would also be encompassed as one configuration of the present invention.

Moreover, since the liquid crystal display device according to the present invention is formed by the above-described manufacturing methods, it can be manufactured with the same materials and steps as those for a transmission-type liquid crystal display device. Therefore, at low cost, a liquid crystal display device having a high reflection efficiency can be provided.

INDUSTRIAL APPLICABILITY

According to the present invention, transflective-type and reflection-type liquid crystal display devices having a high image quality can be provided at low cost. Liquid crystal display devices according to the present invention can be suitably used for transflective-type and reflection-type liquid crystal display devices which perform display by utilizing reflected light, e.g., mobile phones, onboard display device such as car navigation systems, display devices of ATMs and vending machines, etc., portable display devices, laptop PCs, and the like.

The invention claimed is:

1. A liquid crystal display device comprising a reflection region for reflecting incident light toward a display surface, wherein
the reflection region includes a metal layer, an insulating layer formed on the metal layer, a semiconductor layer formed on the insulating layer, and a reflective layer formed on the semiconductor layer;
a plurality of recesses are formed in the metal layer;
recesses/protrusions, reflecting a shape of the metal layer, are formed in the reflective layer in the reflection region;
a plurality of protrusions of the metal layer, each having a bottom surface, an upper surface and a slope, are formed between the plurality of recesses of the metal layer; and
a width a of the bottom surface of at least one of the plurality of protrusions in the metal layer satisfies $a \leq 2(x+y)/\tan \theta$ where a denotes the width of the bottom surface of each of the plurality of protrusions, x a thickness between the bottom surface and the upper surface, θ a tilt angle of the slope with respect to the bottom surface, and y a total thickness of the insulating layer, the semiconductor layer and the reflective layer.

2. The liquid crystal display device of claim 1, wherein the width of the bottom surface of at least one of the plurality of protrusions in the metal layer is 15.88 μm or less.

3. The liquid crystal display device of claim 1, wherein the width of the bottom surface of at least one of the plurality of protrusions in the metal layer is 1.00 μm or more.

4. The liquid crystal display device of claim 1, wherein the tilt angle of the slope of the plurality of protrusions with respect to the bottom surface is 10° or more and less than 90°.

5. The liquid crystal display device of claim 1, wherein a plurality of protruding portions of the metal layer including a stepped slope are formed between the plurality of recesses in the metal layer, wherein the stepped slope includes an upper slope, a flat portion and a lower slope, the upper surface of the protrusion is the upper surface of the protruding portion, the slope of the protrusion is the upper slope of the stepped slope, and the bottom surface of the protrusion is formed generally on the same plane as the flat portion of the stepped slope.

6. The liquid crystal display device of claim 5, wherein the lower slope of the stepped slope of the metal layer further includes a stepped slope.

7. The liquid crystal display device of claim 5, wherein a step reflecting the stepped slope of the metal layer is formed on a surface of the reflective layer.

8. The liquid crystal display device of claim 7, wherein a first recess and a second recess located inside the first recess are formed on a surface of the reflective layer.

9. The liquid crystal display device of claim 5, wherein the width of the bottom surface of at least one of the plurality of protrusions in the metal layer is 14.75 μm or less.

10. The liquid crystal display device of claim 1, wherein a tilt angle of the slope of the plurality of protrusions with respect to the bottom surface is 10° or more and 20° or less, and the width of the bottom surface of at least one of the plurality of protrusions is 2.75 μm or more and 15.88 μm or less.

11. The liquid crystal display device of claim 1, wherein the metal layer serves as one of a pair of electrodes forming a storage capacitor of the liquid crystal display device.

12. A method for manufacturing a liquid crystal display device having a reflection region for reflecting incident light toward a display surface, comprising:
a step of forming a metal film on a substrate;
a step of shaping the metal film in the reflection region to thereby form a metal layer having a plurality of recesses;
a step of forming an insulating layer on the metal layer;
a step of forming a semiconductor layer on the insulating layer; and
a step of stacking a metal film on the semiconductor layer to thereby form a reflective layer having recesses/protrusions reflecting a shape of the plurality of recesses in the metal layer, wherein
in the step of forming a metal layer, a plurality of protrusions of the metal layer, each having a bottom surface, an upper surface and a slope, are formed between the plurality of recesses; and
in the step of forming a metal layer, the metal layer is formed so that a width a of the bottom surface of at least one of the plurality of protrusions satisfies $a \leq 2(x+y)/\tan \theta$ where a denotes the width of the bottom surface of each of the plurality of protrusions, x a thickness between the bottom surface and the upper surface, θ a tilt angle of the slope with respect to the bottom surface, and y a total thickness of the insulating layer, the semiconductor layer and the reflective layer.

13. The manufacturing method of claim 12, wherein the metal layer is formed so that the width of the bottom surface of at least one of the plurality of protrusions is 15.88 μm or less.

14. The manufacturing method of claim 12, wherein the metal layer is formed so that the width of the bottom surface of at least one of the plurality of protrusions is 1.00 μm or more.

15. The manufacturing method of claim 12, wherein the metal layer is formed so that the tilt angle of the slope of the plurality of protrusions with respect to the bottom surface is 10° or more and less than 90°.

16. The manufacturing method of claim 12, wherein in the step of forming a metal layer, a plurality of protruding portions having a stepped slope and including the plurality of protrusions in upper portions thereof are formed between the plurality of recesses.

17. The manufacturing method of claim 12, wherein in the step of forming a metal layer, a protruding portion having a stepped slope with a plurality of tiers of steps and including the protrusion in an upper portion thereof is formed between the plurality of recesses.

18. The manufacturing method of claim 16, wherein in the step of forming a reflective layer, a step reflecting the stepped slope of the protruding portion of the metal layer is formed on a surface of the reflective layer.

19. The manufacturing method of claim 18, wherein in the step of forming a reflective layer, a first recess and a second recess located inside the first recess are formed on a surface of the reflective layer.

20. The manufacturing method of claim 16, wherein in the step of forming a metal layer, the metal layer is formed so that a width of the bottom portion of at least one of the plurality of protrusions in the metal layer is 14.75 μm or less.

21. The manufacturing method of claim 12, wherein in the step of forming a metal layer, the metal layer is formed so that a tilt angle of the slope of the plurality of protrusions with respect to the bottom surface is 10° or more and 20° or less, and the width of the bottom surface of at least one of the plurality of protrusions is 2.75 μm or more and 15.88 μm or less.

22. The manufacturing method of claim 12, wherein the metal layer is formed from the same metal as and concurrently with a gate electrode of a switching element of the liquid crystal display device.

23. A liquid crystal display device comprising a reflection region for reflecting incident light toward a display surface, wherein the reflection region includes a metal layer, an insulating layer formed on the metal layer, a reflective layer formed on the insulating layer;

a plurality of recesses are formed in the metal layer;

recesses/protrusions, reflecting a shape of the metal layer, are formed in the reflective layer in the reflection region;

a plurality of protrusions of the metal layer, each having a bottom surface, an upper surface and a slope, are formed between the plurality of recesses of the metal layer; and a width a of the bottom surface of at least one of the plurality of protrusions in the metal layer satisfies $a \leq 2(x+y)/\tan \theta$ where a denotes the width of the bottom surface of each of the plurality of protrusions, x a thickness between the bottom surface and the upper surface, θ a tilt angle of the slope with respect to the bottom surface, and y a total thickness of the insulating layer and the reflective layer.

24. A method for manufacturing a liquid crystal display device having a reflection region for reflecting incident light toward a display surface, comprising:

a step of forming a metal film on a substrate;

a step of shaping the metal film in the reflection region to form a metal layer having a plurality of recesses;

a step of forming an insulating layer on the metal layer; and a step of stacking a metal film on the insulating layer to thereby form a reflective layer having recesses/protrusions reflecting a shape of the plurality of recesses in the metal layer, wherein in the step of forming a metal layer, a plurality of protrusions of the metal layer, each having a bottom surface, an upper surface and a slope, are formed between the plurality of recesses; and in the step of forming a metal layer, the metal layer is formed so that a width a of the bottom surface of at least one of the plurality of protrusions satisfies $a \leq 2(x+y)/\tan \theta$ where a denotes the width of the bottom surface of each of the plurality of protrusions, x a thickness between the bottom surface and the upper surface, θ a tilt angle of the slope with respect to the bottom surface, and y a total thickness of the insulating layer and the reflective layer.

\* \* \* \* \*